Figure 1:
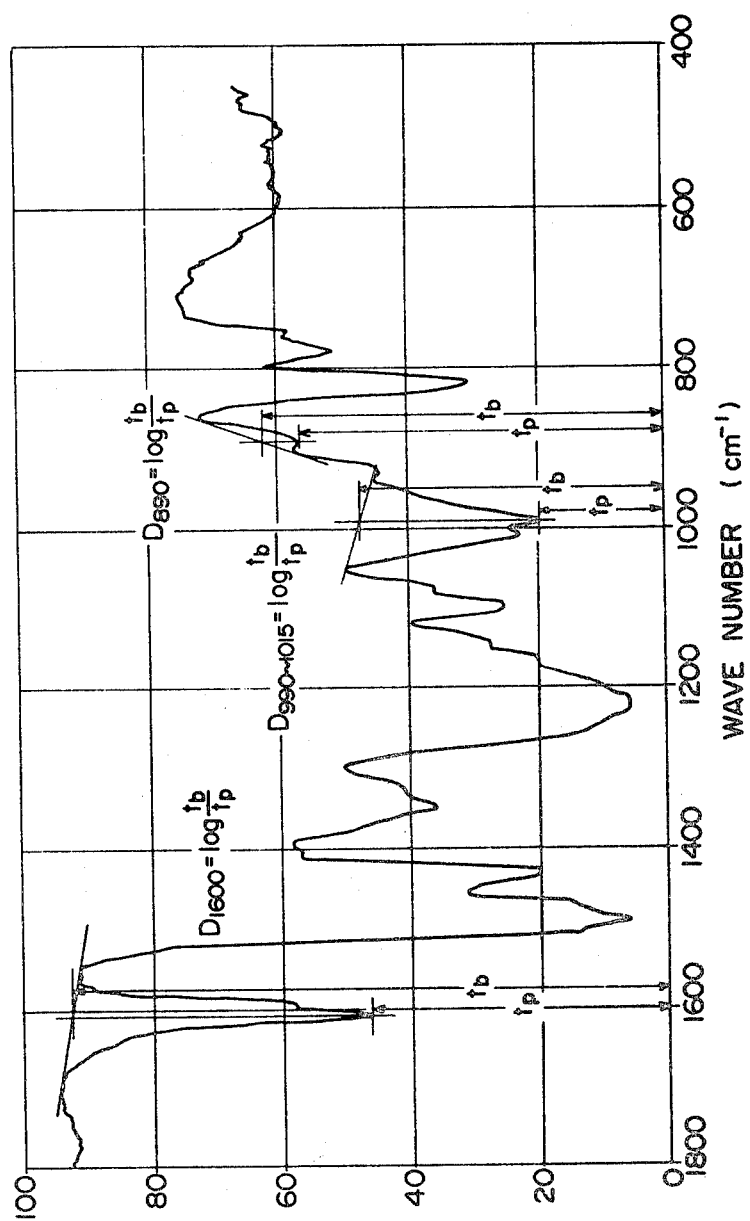

United States Patent [19]

Koyama et al.

[11] Patent Number: 4,476,277

[45] Date of Patent: Oct. 9, 1984

[54] RESIN COMPOSITION CONTAINING GRANULAR OR POWDERY PHENOL-ALDEHYDE RESIN

[75] Inventors: Hiroaki Koyama; Shigeo Shimizu, both of Kobe, Japan

[73] Assignee: Kanebo Ltd., Tokyo, Japan

[21] Appl. No.: 452,737

[22] Filed: Dec. 23, 1982

[30] Foreign Application Priority Data

| Dec. 26, 1981 [JP] | Japan | 56-209558 |
|---|---|---|
| Dec. 28, 1981 [JP] | Japan | 56-209850 |
| Feb. 18, 1982 [JP] | Japan | 57-23530 |
| Mar. 4, 1982 [JP] | Japan | 57-33099 |
| Mar. 4, 1982 [JP] | Japan | 57-33100 |
| Mar. 5, 1982 [JP] | Japan | 57-34036 |

[51] Int. Cl.$^3$ .................. C08L 27/08; C08L 61/14
[52] U.S. Cl. .................. 524/509; 524/400;
524/504; 524/505; 524/494; 524/511; 524/537;
524/538; 524/539; 524/541; 525/134; 525/139;
525/141; 525/142; 525/143; 525/144; 525/145;
525/414; 525/428; 525/429; 525/442; 525/443;
525/456; 525/465; 525/472; 525/481; 525/497;
525/501
[58] Field of Search ............... 525/139, 142, 145, 500,
525/501, 934, 134, 143, 144, 145, 428, 429, 442,
443, 456, 465, 472; 524/509, 537, 538, 539, 541,
494

[56] References Cited

U.S. PATENT DOCUMENTS

| 1,216,728 | 6/1917 | Pollak | 528/165 |
|---|---|---|---|
| 2,120,549 | 6/1938 | Dike | 528/137 |
| 2,970,121 | 1/1961 | Schmittberger | 525/501 |
| 3,419,527 | 12/1968 | Akutin et al. | 528/137 |
| 3,558,559 | 1/1971 | LeBlanc | 528/162 |
| 3,687,896 | 8/1972 | Vargiv et al. | 528/137 |
| 3,932,344 | 1/1976 | O'Day, Jr. et al. | 525/145 |
| 4,046,734 | 9/1977 | Zimmerli | 528/165 |
| 4,169,937 | 10/1979 | Vargiv et al. | 528/162 |
| 4,206,095 | 6/1980 | Wynstra et al. | 528/137 |
| 4,317,901 | 3/1982 | Cosway | 528/165 |
| 4,319,016 | 3/1982 | Kurobe et al. | 528/162 |
| 4,336,179 | 6/1982 | Iyer | 528/165 |
| 4,366,303 | 12/1982 | Kopf | 528/129 |

Primary Examiner—Theodore E. Pertilla
Attorney, Agent, or Firm—Sherman & Shalloway

[57] ABSTRACT

A resin composition comprising
(I) a granular or powdery resin which is a condensation product of a phenol, an aldehyde and optionally a nitrogen-containing compound having at least two active hydrogens and is characterized by (A) containing spherical primary particles and their secondary agglomerated particles each having a particle diameter of 0.1 to 150 microns, (B) having such a size that at least 50% by weight thereof can pass through a 100 Tyler mesh sieve, and (C) having a free phenol content, determined by liquid chromatography, of not more than 500 ppm, and
(II) at least one member selected from the group consisting of (1) a rubbery elastic material, (2) a thermoplastic resin and (3) a curable reisn other than said granular or powdery resin (I) and/or a filler material other than said granular or powdery resin (I).

19 Claims, 2 Drawing Figures

RESIN COMPOSITION CONTAINING GRANULAR OR POWDERY PHENOL-ALDEHYDE RESIN

This invention relates to a resin composition containing a novel granular or powdery phenol-aldehyde resin, and more specifically, to a resin composition containing a novel granular or powdery phenol-aldehyde resin which has good storage stability and flow characteristics and reactivity and is suitable as a molding material.

Typical known phenol-aldehyde resins are novolak resins and resol resins.

The novolak resins are usually produced by reacting an excess of phenol with formaldehyde in the presence of an acid catalyst such as oxalic acid (usually in an amount of 0.2 to 2%) while maintaining the mole ratio of phenol to formaldehyde at, for example, 1:0.7–0.9. The novalak resins so produced have no self-crosslinkability and are thermoplastic because they are composed of, as main components, tri-, tetra- and pentamers resulting from the bonding of phenol moieties mainly by methylene groups and contain almost no methylol groups. The novolak resins can be converted to cured resins by, for example, reacting them under heat with a crosslinking agent, such as hexamine (hexamethylenetetramine), which is at once a formaldehyde generator and an organic base (catalyst) generator, or by mixing them with a solid acid catalyst and paraformaldehyde and reacting them under heat. When such a novolak resin in accordance with the former method is used as a molding material, the resulting molded article will be foamed owing to the generation of ammonia by the decomposition of hexamine, or the undecomposed part of hexamine or an organic base formed as a by-product will remain in the molded article. This causes the defect that the properties of the molded article are deteriorated, and the curing reaction is time-consuming. According to the latter curing method, those parts of the novolak resin which make contact with the paraformaldehyde and the acid catalyst undergo excessive crosslinking reaction, and it is difficult to cure the resin uniformly. Furthermore, the acid catalyst or paraformaldehyde remains in the molded article to degrade its properties with the lapse of time, or troubles such as foaming occur owing to the decomposition of the acid catalyst or paraformaldehyde during curing. Another defect is that since the novolak resin is obtained by the reaction of an excess of phenol and contains a relatively large amount (for example about 0.5 to about 2% by weight) of free phenol, a resin composition containing it generates phenol when molded under heat and causes troubles during the molding operation.

A process for producing cured novolak resin fibers was recently suggested which comprises heating a novolak resin at a high temperature to form a product having a considerably high degree of condensation, purifying the product by removing components having a low degree of condensation thereby to obtain a product having a relatively high degree of condensation and comprising phenol moieties linked to each other by 7 to 10 methylene groups, melt-spinning the product to form novolak fibers, dipping the fibers in an aqueous solution of hydrochloric acid and formaldehyde and gradually heating the solution from room temperature to allow curing reaction to proceed from the surface of the fibers (Japanese Patent Publication No. 11284/1973). Granules or powders obtained by cutting or pulverizing the cured fibers are expensive, and do not possess good flow characteristics.

On the other hand, the known resol resins are produced usually by reacting phenol with an excess of formaldehyde in the presence of a basic catalyst (about 0.2 to 2% by weight based on the phenol) such as sodium hydroxide, ammonia or an organic amine while maintaining the mole ratio of phenol to formaldehyde at, for example, 1:1–2. The resol resins so produced contain mono-, di- and trimers of phenol having a relatively large amount of methylol groups as main components and are very reactive. It is the usual practice therefore to store them in a refrigerator as a water or methanol solution having a solids concentration of not more than 60%. The period for which such storage is possible is about 3 to 4 months at the longest. To mold and cure such a resol resin, the water or methanol is removed and the resin is heated in the optional presence of an acid catalyst. The rate of this curing reaction is very high, and, for example at 150° C., gellation occurs within several tens of seconds. Since the resol resin has very high reactivity, it cannot be obtained as a stable granular or powdery solid. Furthermore, because a cured product of the resol resin has a highly developed three-dimensional structure, it is very hard and its conversion to a fine granular or powdery molding material is quite difficult (Japanese Patent Publication No. 12958/1978). The resol resins usually contain 1 to 10% by weight, based on the solids, of free phenol.

Several years ago, a process was disclosed which comprises reacting a phenol and formaldehyde in the presence of at least a nitrogen-containing compound as a catalyst, and reacting the resulting condensate with a hydrophilic polymeric compound to form a granular or powdery resin (Japanese Patent Publication No. 42077/1978). The resulting resin in the non-gelled state contains as much as about 5 to 6% of free phenol (Examples 1 to 4 of the Japanese patent document), and a gelled product of the resin (Example 5 of the Japanese patent document) is a very hard non-reactive resin. Molded articles obtained from the gelled resin have deteriorated properties because of its inclusion of the nitrogen-containing compound used as catalyst or the hydrophilic polymeric compound.

A process is also known which comprises reacting a phenol and formaldehyde in a basic aqueous solution, mixing the resulting prepolymer with a protective colloid, and coagulating the prepolymer under acidity to form inert solid beads (Japanese Patent Publication No. 13491/1976). The coagulated product corresponds to a cured product of a resol resin, and has no reactivity. Furthermore, since it contains a salt or acid and the protective colloid, molded articles prepared from it have degraded properties.

Attempts have been made to incorporate a phenol formaldehyde resin in thermoplastic resins, rubbers or curable resins, but from the viewpoint of its use as a filler, it is first of all difficult to obtain it in a shape or form suitable as fillers. The phenol-formaldehyde resin also has the disadvantage that it contains substances which adversely affect thermoplastic resins, rubbers or curable resins.

The present inventors previously provided a novel granular or powdery phenol-aldehyde resin free from the aforesaid defects, and a process for its production.

It is an object of this invention to provide a resin composition containing such a novel granular or powdery resin.

Another object of this invention is to provide a granular or powdery resin composition having good moldability which contains a granular or powdery resin having good flow characteristics.

Still another object of this invention is to provide a resin composition which contains a granular or powdery resin containing as small as not more than 500 ppm of free phenol and is therefore safe and easy to handle.

Yet another object of this invention is to provide a resin composition which contains a granular or powdery resin capable of crosslinking with itself or with thermoplastic resins, rubbers or curable resins, and in which, therefore, the granular or powdery resin in the cured state can be chemically combined with the thermoplastic resins, rubbers, etc. to give very uniform properties.

A further object of this invention is to provide a resin composition which contains a granular or powdery nitrogen-containing resin and a thermoplastic resin, and in the molded state, has excellent mechanical properties such as high strength, high hardness, low compression set and excellent dimensional stability.

A still further object of this invention is to provide a resin composition which contains a thermoplastic resin and gives molded articles having excellent electrical insulation or chemical resistance and good platability.

A yet further object of this invention is to provide a resin composition containing a rubbery elastic material, which contains a granular or powdery resin having reactivity with the rubbery elastic material and therefore in the cured state shows excellent mechanical properties such as high strength, high hardness, low compression set, or excellent dimensional stability.

An additional object of this invention is to provide a resin composition which contains a rubbery elastic material, and in the cured state, shows excellent electrical insulation or heat resistance.

An additional object of this invention is to provide a resin composition which contains a curable granular or powdery resin or a curable resin, is melted by heating, and in the cured state, has excellent wettability with various fillers.

An additional object of this invention is to provide a resin composition which contains a curable granular or powdery resin or a curable resin, and in the cured state, has excellent compression strength, chemical resistance, electrical properties such as electric insulation, heat resistance or heat insulation, thus exhibiting the excellent properties of a phenol resin.

Figure 2:
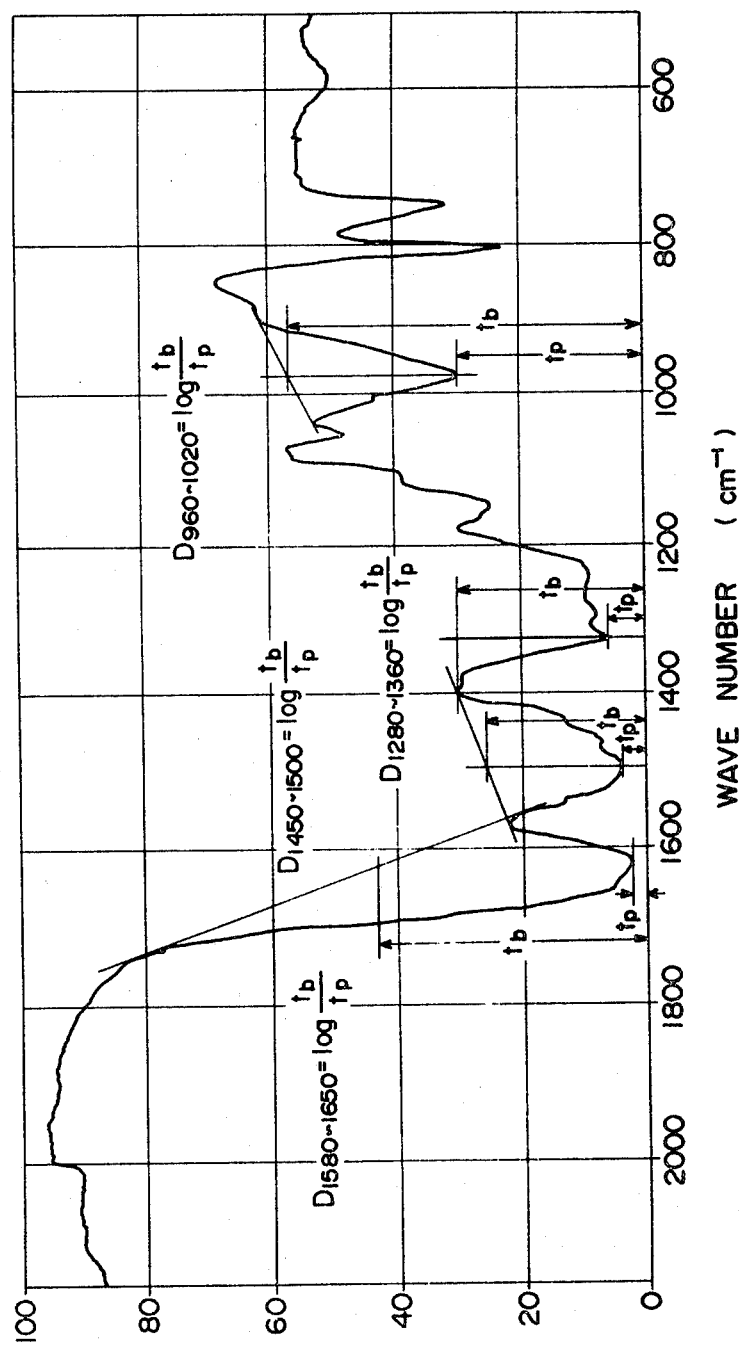

Other objects and advantages of this invention will become apparent from the following description and the accompanying drawings in which:

FIGS. 1 and 2 are each infrared absorption spectral charts by the KBr method of the granular or powdery resin obtained from phenol and formaldehyde obtained in Run No. 44 and from phenol, formaldehyde and urea obtained in Run No. 112, respectively.

In accordance with this invention, these objects and advantages of this invention are achieved by a resin composition comprising (I) a granular or powdery resin which is a condensation product of a phenol, an aldehyde and optionally a nitrogen-containing compound having at least two active hydrogens and is characterized by (A) containing spherical primary particles and their secondary agglomerated particles each having a particle diameter of 0.1 to 150 microns, (B) having such a size that at least 50% by weight thereof can pass through a 100 Tyler mesh sieve, and (C) having a free phenol content, determined by liquid chromatography, of not more than 500 ppm, and (II) at least one member selected from the group consisting of (1) a rubbery elastic material, (2) a thermoplastic resin and (3) a curable resin other than said granular or powdery resin (I) and/or a filler material other than said granular or powdery resin (I).

The granular or powdery phenol-aldehyde resin used in this invention is produced from a phenol, an aldehyde and optionally a nitrogen-containing compound having at least two hydrogens by a method to be described hereinbelow.

The granular or powdery phenol-aldehyde resin (to be referred to as the granular or powdery resin) is characterized by (A), (B) and (C) stated above. The limitation that the spherical primary particles and their secondary agglomerated particles have a particle diameter of 0.1 to 150 microns (A), the limitation that at least 50% by weight of the entire resin can pass through a 100 Tyler mesh sieve (B), and the limitation that the resin has a free phenol content, determined by liquid chromatography, of not more than 500 ppm (C) are based on the measuring methods to be described hereinbelow.

A first feature of the product of the invention is that it consists mostly of spherical primary particles and secondary particles resulting from the agglomeration of the primary particles, such having a particle diameter of 0.1 to 150 microns, preferably 0.1 to 100 microns as specified in (A) above and is quite different from a forcibly pulverized product of a cured product of a known novolak or resol resin or a pulverization product of known cured novolak fibers.

Usually at least 30%, preferably at least 50%, of the granular or powdery resin consists of spherical primary particles and their agglomerated secondary particles each of which has a particle diameter of 0.1 to 150 microns, preferably 0.1 to 100 microns.

In the case of the granular or powdery resin containing the nitrogen-containing compound, usually at least 30%, preferably at least 50%, thereof consists of spherical primary particles and secondary particles resulting from the agglomeration of the primary particles, each of which has a particle diameter of 0.1 to 100 microns, preferably 0.1 to 50 microns. The expression 30% or 50% means that as defined in the description of the method for measuring the particle diameter given hereinbelow, it is 30% or 50% based on the number of entire particles (including the secondary agglomerated particles) of the resin in one visual field of an optical microscope having a magnification of 100 to 1,000. It is preferred that 70% to substantially 100% of the granular or powdery product consists of spherical primary particles and secondary agglomerated particles each having a particle diameter of 0.1 to 150 microns (0.1 to 100 microns in the case of the resin containing the nitrogen-containing compound). Especially preferably, at least 30%, especially at least 50%, of the number (as an average of those in five visual fields) of particles in the visual field of a microphotograph in accordance with the above definition consists of spherical primary particles and secondary agglomerated particles having a particle diameter in the range of 0.1 to 100 microns, preferably 0.1 to 50 microns (in the case of the resin containing the nitrogen-containing compound, 0.1 to 50 microns, preferably 0.1 to 20 microns).

Since the granular or powdery resin product used in this invention is formed mainly of the minute spherical primary particles and the secondary agglomerated particles thereof, it is very small in size as specified in (B) above. Thus, at least 50% by weight, preferably at least 70% by weight, especially preferably at least 80% by weight, of the entire resin passes through a 100 Tyler mesh sieve (a 150 Tyler mesh sieve in the case of the resin containing the nitrogen-containing compound). The expression "passing through the sieve" does not exclude the exertion of a force which does not cause forcible destruction of the particles (including the secondary agglomerated particles) in the procedure of screening the granular or powdery product through the sieve, for example light crumpling of the granular or powdery product by hand, light pushing or levelling of the particles on the mesh by means of a brush, or light tapping of the particles by hand because the particles of the granular or powdery resin of this invention becomes agglomerated as their average particle size becomes smaller.

As specified in (C) above, the granular or powdery resin used in the invention has a free phenol content, determined by liquid chromatography, of not more than 500 ppm. The preferred free phenol content is not more than 250 ppm, above all not more than 100 ppm, for the resin containing the nitrogen-containing compound, and above 50 ppm but not more than 400 ppm, especially above 50 ppm but not more than 300 ppm. That the powdery or granular resin used in the invention has a very low free phenol content is presumably because the process for its production described hereinbelow comprises adding the phenol or the phenol and the nitrogen-containing compound or the diluted solution thereof to the HCl-aldehyde bath to form a uniform solution at least partly, then forming very fine white suspended particles and developing them into stable fine particles, and therefore, substantially all of the phenol added, especially the phenol which participates in the formation of the product of the invention, reacts with the aldehyde present in large excess. The granular or powdery products obtained by the methods disclosed in Japanese Patent Publication No. 42077/1978 cited above has a free phenol content of as high as 0.3 to about 6% by weight. In contrast, the free phenol content of the granular or powdery resin used in the invention is quite small, and this fact is an important advantage of the process of the invention using granular or powdery resins of this kind and is very surprising.

The granular or powdery resin used in this invention may also be defined by the ratio of the absorption intensity of an absorption peak assigned to the aromatic double bond to that of an absorption peak assigned to the methylol group in its infrared absorption spectrum. The positions of the two peaks and their absorption intensities differ somewhat depending upon the presence or absence of the nitrogen-containing compound.

The granular or powdery resin substantially free from the nitrogen-containing compound has a $D_{990\text{-}1015}/D_{1600}$ ratio of from 0.2 to 9.0 in its infrared absorption spectrum determined by a KBr tablet method, wherein $D_{1600}$ represents the absorption intensity of an absorption peak at 1600 cm$^{-1}$ (the peak assigned to benzene) and $D_{990\text{-}1015}$ represents the highest absorption intensity of absorption peaks in the range of 990 to 1015 cm$^{-1}$ (the peaks assigned to the methylol groups). This resin further has a $D_{890}/D_{1600}$ ratio, wherein $D_{890}$ represents the absorption intensity of a peak at 890 cm$^{-1}$ (the peak assigned to a lone hydrogen atom on the benzene ring), of from 0.09 to 1.0. Preferably, it has a $D_{990\text{-}1015}/D_{1600}$ ratio of from 0.2 to 7.0, especially from 0.4 to 5.0, and a $D_{890}/D_{1600}$ ratio of from 0.1 to 0.9, especially from 0.12 to 0.8.

It is widely known with regard to phenol-formaldehyde resins that in their infrared absorption spectra, the peak at 1600 cm$^{-1}$ shows an absorption assigned to the benzene ring, the peaks at 990 to 1015 cm$^{-1}$ show absorptions assigned to the methylol groups, and the peak at 890 cm$^{-1}$ shows an absorption assigned to a lone hydrogen atom on the benzene ring.

The granular or powdery resin containing the nitrogen-containing compound has a $D_{960\text{-}1020}/D_{1400\text{-}1500}$ ratio of from 0.1 to 2.0 in its infrared absorption spectrum measured by a KBr tablet method, wherein $D_{1450\text{-}1500}$ represents the highest absorption intensity of absorption peaks in the range of 1450 to 1500 cm$^{-1}$ (the peaks assigned to the aromatic double bond) and $D_{960\text{-}1020}$ represents the highest absorption intensity of absorption peaks in the range of 960 to 1020 cm$^{-1}$ (the peaks assigned to the methylol groups), and preferably further has a $D_{1280\text{-}1360}/D_{1450\text{-}1500}$ ratio of 0.15 to 3.0 in the infrared absorption spectrum, wherein $D_{1280\text{-}1360}$ represents the highest absorption intensity of absorption peaks in the range of 1280 to 1360 cm$^{-1}$ (the peaks assigned to the carbon-nitrogen bond).

Preferably, this resin has a $D_{960\text{-}1020}/D_{1450\text{-}1500}$ ratio of from 0.15 to 0.6 and further a $D_{1280\text{-}1360}D_{1450\text{-}1500}$ ratio of from 0.2 to 2.0. Especially preferably it has a $D_{960\text{-}1020}/D_{1450\text{-}1500}$ ratio of from 0.2 to 0.4, and further a $D_{1280\text{-}1360}/D_{1450\text{-}1500}$ ratio of from 0.3 to 1.5.

The resin used in this invention further has such a characteristic in its infrared absorption spectrum determined by a KBr tablet method that it has a $D_{1580\text{-}1650}/D_{1450\text{-}1500}$ ratio of from 0.3 to 4.5, preferably from 0.75 to 2.0, especially preferably from 1.0 to 1.5, wherein $D_{1580\text{-}1650}$ represents the highest absorption intensity of absorption peaks in the range of 1580 to 1650 cm$^{-1}$.

Generally, it is difficult to determine the assignment of various functional groups of a substance having a three-dimensional crosslinked structure by an infrared absorption spectroscopic method because peaks in its infrared absorption spectral chart frequently shift greatly. But from the infrared absorption spectra of the phenol-aldehyde resin and various nitrogen-containing compounds, it has been determined that in the infrared absorption spectrum of the resin of this invention, the absorption peaks at 960 to 1020 cm$^{-1}$ are assigned to the methylol groups, the absorption peaks at 1280 to 1360 cm$^{-1}$ are assigned to the carbon-nitrogen bond, and the absorption peaks at 1450 to 1500 cm$^{-1}$ are assigned to the aromatic double bond.

The definite assignment of the absorptions at 1580 to 1650 cm$^{-1}$ is difficult. But since the $D_{1580\text{-}1650}/D_{1450\text{-}1500}$ using the highest absorption intensity of the peaks at 1580 to 1650 cm$^{-1}$ can clearly distinguish from the same ratio in a nitrogen-free phenol-formaldehyde resin, these absorptions can be recognized as characteristic absorptions for identifying the granular or powdery resin containing the nitrogen-containing compound.

It is understood that the ratio of absorption intensities in the infrared absorption spectrum of the product of this invention, for example, $D_{990\text{-}1015}/D_{1600}=0.2\text{-}9.0$ or $D_{960\text{-}1020}/D_{1450\text{-}1500}=0.1\text{-}2.0$ which is one parameter for specifying the granular or powdery resin used in the invention, is a value associated with its structure and shows that this resin contains a considerable amount of the methylol groups and the methylol group content can be adjusted within a certain range.

The preferred product of this invention having a $D_{990-1050}/D_{1600}$ ratio of from 0.2 to 7.0, or a $D_{960-1020}/D_{1450-1500}$ ratio of from 0.15 to 0.6, and above all a $D_{990-1015}/D_{1600}$ ratio of from 0.4 to 5.0 or a $D_{960-1020}/D_{1450-1500}$ ratio of from 0.2 to 0.4 contain methylol groups in a moderate degree of concentration and is stabler.

The fact that in its infrared absorption spectrum the granular or powdery resin used in this invention has a $D_{890}/D_{1600}$ ratio of from 0.09 to 1.0, preferably from 0.1 to 0.9, above all from 0.12 to 0.8, shows that in this resin, the reaction sites (the ortho- and para-positions) of phenol molecules which participated in the reaction are moderately blocked by methylol groups.

Generally, one or both of the $D_{990-1015}/D_{1600}$ ratio and the $D_{890}/D_{1600}$ ratio of a cured product of a known resol resin are lower than those of the granular or powdery resin used in this invention. A cured product of a known novolak resin cured with hexamine has a $D_{890}/D_{1500}$ ratio which is generally lower than the lower limit of this ratio of the product of this invention.

It has been found by elemental analysis that the granular or powdery resin used in this invention which is substantially free from the nitrogen-containing compound is composed of carbon, hydrogen and oxygen and has the following composition.

C: 70 to 80% by weight
H: 5 to 7% by weight
O: 17 to 21% by weight
(Total 100% by weight)

It has also been found that many of the granular or powdery resins used in this invention which contain the nitrogen-containing compound contain at least 1% by weight, preferably 2 to 30% by weight of nitrogen.

The granular or powdery resin used in this invention can be obtained either as a resin whose curing reaction has not proceeded to a great extent or as a resin whose curing reaction has proceeded to some extent, by the manufacturing process to be described hereinbelow. Accordingly, when the granular or powdery resin used in this invention is pressed at 100° C. for 5 minutes in accordance with the heat fusibility test to be described hereinbelow, at least a part of the resin fuses to form a lumpy or plate-like mass (i), or the resin assumes the form of a granules or powder without substantial melting or meltadhesion (ii).

Those granular or powdery resins used in this invention which have relatively high heat fusibility as mentioned above shows a methanol solubility, measured by the testing method to be given hereinbelow, of at least 20% by weight, especially at least 30% by weight, and in some cases, at least 40% by weight.

Since the granular or powdery resin contains spherical primary particles and their secondary agglomerated particles each having a particle diameter of 0.1 to 150 microns [the characteristic (A) described hereinbove] in an amount of preferably at least 30%, and usually at least 50% by weight, preferably at least 70% by weight, of the resin particles can pass through a 100 Tyler mesh sieve, the resin has very good flowability, and can be mixed with another material easily and in a relatively large amount. Furthermore, since many of the granular or powdery resins used in this invention contain very minute spherical primary particles as a basic constituent, a cured molded article prepared from a resin composition containing this resin has excellent mechanical properties, particularly high resistance to compression. The granular or powdery resins are very stable at ordinary temperatures and contain considerable amounts of methylol groups. Hence, they show reactivity when heated, and give cured molded articles having not only excellent physical and mechanical properties but also excellent thermal insulation, heat resistance and electrical properties such as electrical insulation, and chemical resistance.

Furthermore, the granular or powdery resin has a free phenol content of usually not more than 500 ppm, and therefore, its handling is very easy, and safe. Furthermore, because of its very low free phenol content, a side-reaction attributed to the phenol is reduced in obtaining a precursor article from the granular or powdery resin.

The granular or powdery resin does not substantially contain a hydrophilic polymeric compound because it is produced by a process in which the reaction system does not substantially contain a hydrophilic polymeric compound.

The granular or powdery resin used in this invention is very fine and has good storage stability and flow characteristics. Furthermore, because it contains a certain amount of methylol groups, it has reactivity when molded into a precursor article and heated. Hence, it gives a cured article having uniform properties.

The granular or powdery resin used in this invention can be produced by contacting a phenol, or both a phenol and a nitrogen-containing compound containing at least two active hydrogens with a hydrochloric acid-aldehyde bath containing (a) hydrochloric acid (HCl) in a concentration of 3 to 28% by weight, preferably 8 to 25% by weight, above all 12 to 22% by weight and (b) formaldehyde (HCHO) in a concentration of 3 to 25% by weight, preferably 5 to 20% by weight, above all 7 to 15% by weight, and other aldehydes in a concentration of 0 to 10% by weight with (c) the total concentration of hydrochloric acid and formaldehyde being 10 to 40% by weight, preferably 15 to 35% by weight, above all 20 to 32% by weight, while maintaining a bath ratio, defined by the quotient of the weight of the hydrochloric acid-aldehyde bath divided by the total weight of the phenol and the nitrogen-containing compound, of at least 8.

Preferably, in addition to the three requirements (a), (b) and (c), the composition of the HCL-aldehyde bath is such that the mole ratio of the aldehyde in the bath to the phenol to be contacted with the bath or the phenol and the nitrogen-containing compounds combined is at least 2, especially at least 2.5, above all at least 3 [requirement (d)]. There is no particular upper limit to the above mole ratio (d). Preferably, the upper limit is 20, especially 15. The especially preferred mole ratio (d) is from 4 to 15, above all from 8 to 10. The characteristic feature of the aforesaid process is that a bath of an aqueous solution of hydrochloric acid and formaldehyde having a considerably high HCl concentration and containing formaldehyde in molar excess to the phenol or both the phenol and the nitrogen-containing compound is contacted with the phenol or both the phenol and the nitrogen-containing compound at a bath ratio of at least 8, preferably at least 10.

Since the aforesaid process is carried out while the concentration of each of hydrochloric acid and aldehyde is kept at at least 3% by weight, and the bath ratio, at not less than 8, the weight percentage of hydrochloric acid or aldehyde based on the weight of the phenol or the total weight of the phenol and the nitrogen-containing compound is at least 24% by weight. Furthermore, since in this process, the total concentration of hydrochloric acid and formaldehyde is at least 10% by weight, the total weight of hydrochloric acid and aldehyde based on the weight of the phenol or the total weight of the phenol and the nitrogen-containing compound is at least 80% by weight. These reaction conditions are fundamentally different from the reaction conditions for the production of known novolak and resol resins described hereinabove.

When the phenol or the phenol and the nitrogen-containing compound are to be contacted with the HCL-aldehyde bath, the bath ratito (as defined hereinabove) is preferably at least 10, especially preferably 15 to 40.

In the aforesaid process, the phenol or the phenol and the nitrogen-containing compound are contacted with the HCl-formaldehyde bath such that after contacting of the phenol with the bath, white suspended particles are formed and thereafter developed into a granular or powdery solid (preferably into a pink-colored granular or powdery solid when the nitrogen-containing compound is not used). The contacting of the phenol and the nitrogen-containing compound with the HCL-aldehyde bath is conveniently carried out such that by adding the phenol and the nitrogen-containing compound together to the HCL-aldehyde bath or first adding the nitrogen-containing compound and then the phenol to the bath, a clear solution is first formed and then white suspended particles are formed and thereafter developed into a granular or powdery solid. In contacting the bath with the phenol or the phenol and the nitrogen-containing compound, it is preferred that before the white suspended particles are formed by the addition of the phenol, the bath be stirred to form a clear, preferably uniform, solution of the phenol or the phenol and the nitrogen-containing compound, and that after the formation of the white suspended particles until the suspended particles change to a solid, the bath (reaction mixture) be not subjected to a mechanical shearing force such as stirring depending upon the ratio of the phenol to the nitrogen-containing compound or the reaction conditions.

The phenol may be added as such, but if desired, it may be diluted with formalin, an aqueous solution of hydrochloric acid, water, etc. prior to the addition.

The temperature of the HCL-aldehyde bath with or without the nitrogen-containing compound dissolved therein, to which the phenol or both the phenol and the nitrogen-containing compound (or the diluted solution thereof) are to be added is suitably not more than 90° C., preferably not more than 70° C. If the temperature of the bath is higher than 40° C., especially higher than 50° C., the rate of the reaction of the phenol or the nitrogen-containing compound with aldehyde increases, it is preferred to add the phenol or both the phenol and the nitrogen-containing compound as a solution diluted with formalin. Furthermore, since the rate of the reaction is high, it is preferred to add the phenol, or both the phenol and the nitrogen-containing compound, preferably a diluted solution thereof as fine streams or smallest possible droplets to the bath.

When the phenol or both the phenol and the nitrogen-containing compound are added to the bath having a temperature of more than 40° C., especially more than 50° C., the rate of the reaction of the phenol and the nitrogen-containing compound becomes higher as the temperature of the bath becomes higher. Thus, within several minutes or instantaneously after the contacting, white suspended particles form and are rapidly developed into a granular or powdery solid.

A granular or powdery solid obtained by adding the phenol or both the phenol and the nitrogen-containing compound, either as such or as a diluted solution thereof, preferably a water diluted solution thereof, to the HCl-aldehyde bath maintained at not more than 40° C., preferably 5° to 35° C., especially preferably 10° to 30° C., and after the formation of white suspended particles, completing the desired reaction at not more than about 50° C., preferably not more than 45° C. shows heat fusibility in the 100° C. fusibility test to be described below because its curing reaction has not proceeded to a great extent.

On the other hand, a granular or powdery solid obtained by adding substantially all of the phenol or the phenol and the nitrogen-containing compound or the diluted solution thereof to the HCL-aldehyde bath maintained at not more than 45° C., preferably 15° to 35° C. with stirring to form a clear solution, thereafter forming white suspended particles without stirring, then forming a granular or powdery solid with or without temperature elevation, and heating the solid at a temperature higher than 50° C., preferably 70° to 95° C., to complete the desired reaction has little or substantially no heat fusibility at 100° C., or shows heat fusibility at a higher temperature, for example at 200° C., or has substantially no heat fusibility at such a high temperature.

When both the phenol and the nitrogen-containing compound are used, it is possible in both of the above-described cases to first add the nitrogen-containing compound to the HCl-formaldehyde bath and then add the phenol alone.

Phenol is most preferred as the phenol. The phenol may also be a mixture of at least 50% by weight, preferably at least 70% by weight, of phenol with at least one known phenol derivative such as o-cresol, m-cresol, p-cresol, bisphenol A, bisphenol S, o-, m- or p-($C_2$-$C_4$ alkyl) -phenols, p-phenylphenol, xylenol, resorcinol and hydroquinone.

Suitable formaldehyde supply sources for the HCl-aldehyde bath include formalin, trioxane, tetraoxane and paraformaldehyde.

The HCL-aldehyde bath used in this invention may include up to 10% by weight of an aldehyde other than formaldehyde in addition to the aforesaid formaldehyde supply sources. Examples of suitable other aldehydes are monofunctional aliphatic aldehydes having 2 to 4 carbon atoms, glyoxal, furfural and benzaldehyde. Examples of the monofunctional aliphatic aldehydes include acetaldehyde, propionaldehyde, n-butyl aldehyde and iso-butyl aldehyde. These aldehydes may be used singly or as a mixture of two or more.

The nitrogen-containing compound used in this invention is a compound containing at least two active hydrogens in the molecule. Preferably, it contains in the molecule at least one group having active hydrogens selected from the class consisting of amino groups, amide groups, thioamide groups, ureylene groups and thioureylene groups. Examples of such nitrogen-containing compound are urea, thiourea, methylol derivatives of urea or thiourea, aniline, melamine, guanidine, guanamine, dicyandiamide, fatty acid amides, polyamide, toluidine, cyanuric acid, and functional derivatives of these compounds. They may be used either singly or as a mixture of two or more.

The granular or powdery resin solid formed in the bath as a result of the completion of the desired reaction is separated from the HCL-aldehyde bath, washed with water, preferably treated with an aqueous alkaline solution such as aqueous ammonia or a methanolic aqueous ammonia solution to neutralize the adhering hydrochloric acid, and again washed with water to give the desired product. As a matter of course, a resin having a relatively high solubility in methanol is preferably neutralized with an aqueous alkaline solution.

The resin of this invention is characterized by containing the aforesaid fine granular or powdery phenol-aldehyde resin.

The resin composition of this invention is described below according to various embodiments.

Embodiment 1

The resin composition of this invention according to embodiment 1 contains a thermoplastic resin in addition to the granular or powdery phenol-aldehyde resin described above.

A wide variety of thermoplastic resins known in the art of polymers can be used in this invention. For example, there may be preferably used versatile engineering plastics such as polyethylene resins, polypropylene resins, polystyrene resins, acrylic resins, vinyl resins, fluorine-containing resins, polyacetal resins, polyamide resins, polyester resins, polycarbonate resins, and polyurethan resins. The polyethylene resins, polypropylene resins, vinyl resins, polyamide resins and polyester resins are especially preferred. These thermoplastic resins may be used singly or as a mixture of two or more.

The aforesaid thermoplastic resins include both homopolymers and copolymers, and the copolymers may be random, graft or block copolymers. The polyethylene resins contain preferably at least 50% by weight, more preferably at least 85% by weight, of ethylene units in the polymer chain. The polypropylene resins contain preferably at least 50% by weight, more preferably at least 85% by weight, of propylene units in the polymer chain. The polystyrene resins contain preferably at least 50% by weight, more preferably at least 85% by weight, of styrene units in the polymer chain. The acrylic resins contain preferably at least 50% by weight, more preferably at least 85% by weight, of methyl or ethyl acrylate or methacrylate units in the polymer chain.

The vinyl resins contain preferably at least 50% by weight, more preferably at least 85% by weight, of units of a vinyl monomer containing an ethylenically unsaturated bond such as vinyl chloride, vinylidene chloride or vinyl acetate. Polyvinyl chloride is especially preferred as the vinyl resin.

The fluorine-containing resins contain preferably at least 50% by weight, more preferably at least 85% by weight, of units of a fluorine-containing vinyl monomer such as tetrafluoroethylene, fluoroethylene or hexafluoropropylene.

The polyethylene resins, polypropylene resins, polystyrene resins, acrylic resins, vinyl resins and fluorine-containing resins may include, in addition to the aforesaid main units, other structural units which are derived from such monomers as ethylene, propylene, acrylic acid, methacrylic acid, a lower alkyl (e.g., a methyl or ethyl) ester of acrylic or methacrylic acid, styrene, α-methylstyrene, vinyl chloride, vinyl acetate and acrylonitrile.

Preferred polyacetal resins are, for example, polyoxymethylene and poly(oxymethylene-oxyethylene)-copolymer. The poly(oxymethylene-oxyethylene)-copolymer may contain not more than 15% by weight of oxyethylene units derived from ethylene oxide in the polymer chain.

Examples of preferred polyamide resins include polycaproamide (6-nylon), polyhexamethylene adipamide (6,6-nylon), polyhexamethylene sebacamide (6,10-nylon), polyundecanamide (11-nylon), polydodecanamide (12-nylon), and polyundecamethylene terephthalamide (11,T-nylon).

The preferred polyester resins are unsaturated polyester resins, such as polyethylene terephthalate, polytetramethylene terephthalate and polyhexamethylene terephthalate.

Preferably, the polycarbonate resins are polycarbonates of bisphenols, particularly bisphenol A.

The thermoplastic resins used in this invention are well known in the art.

Strictly, the suitable mixing ratio between the granular or powdery resin and the thermoplastic resin in the resin composition in accordance with embodiment 1 differs depending upon the properties of the granular or powdery resin used, for example whether it is heat-fusible or not, or upon the type of the thermoplastic resin used.

For example, the resin composition of this invention contains 1 part by weight of the thermoplastic resin and 0.01 to 20 parts by weight, preferably 0.02 to 3 parts, especially preferably 0.03 to 0.9 part, by weight, of the granular or powdery resin.

The resin composition of this invention is provided either as a thermoplastic or thermosetting composition.

The present invention provides a particularly preferred resin composition being thermoplastic and containing 1 part by weight of the thermoplastic resin and 0.05 to 0.5 part by weight of the granular or powdery resin. A heat-setting thermosetting resin composition in accordance with this invention is obtained generally when the granular or powdery resin has high reactivity and the amount of the thermoplastic resin is relatively small, or when the thermoplastic resin has high reactivity with the highly reactive granular or powdery resin although its amount is relatively large. Suitable proportions of the constituent resins which will give such a resin composition of this invention will become apparent from the following description.

As is seen from the foregoing description, the resin composition of this invention contains the powdery or granular or powdery phenol-aldehyde resin which when pressed at 100° C. for 5 minutes according to the heat fusibility test to be described hereinbelow, (i) is at least partly melt-adhered to form a lumpy or plate-like product, or (ii) is in the granular or powdery form without substantial melting or melt-adhesion. It can be said that these species of the granular or powdery resin have thermosetting properties because they further undergo curing reaction upon reating. The difference is that the resin having the property (i) is melted or melt-adhered upon heating because its curing reaction has not yet proceeded fully, whereas the resin having the property (ii) remains granular or powdery without melting or melt-adhesion upon heating because its curing reaction has further proceeded as compared with the resin having the property (i).

The resin composition of this invention comprises the thermoplastic resin as the other component. Since the resin composition of the invention thus contains both the thermosetting resin and the thermoplastic resin, it generally has a greater tendency to be thermoplastic when the content of the thermosetting resin is low and to be thermosetting when the content of the thermosetting granular or powdery resin is large.

However, whether the resin composition of this invention is thermoplastic or thermosetting does not simply depend upon the mixing ratio of the granular or powdery resin and the thermoplastic resin.

Investigations of the present inventors have shown that a resin composition in accordance with this invention which is thermoplastic can be advantageously provided by the following embodiments.

(1) When the heat-fusible species (i) described above is used as the granular or powdery nitrogen-containing resin, it is advantageous to use the granular or powdery resin in an amount of not more than 0.5 part by weight per part by weight of the thermoplastic resin.

(2) When the species (ii) which does not melt or melt-adhere is used as the granular or powdery resin, the amount of the granular or powdery resin is advantageously not more than 2 parts by weight per part by weight of the thermoplastic resin.

(3) When a mixture of the species (i) and (ii) is used as the granular or powdery resin, it is preferred to adjust its amount such that per part by weight of the thermoplastic resin, the amount of the resin species (i) is not more than 0.5 part by weight and the total amount of the mixture is not more than 1.5 parts by weight.

The resin compositions in accordance with this invention which are thermoplastic can be molded by methods generally used for the molding of thermoplastic resins, such as extrusion molding or molding in a die. The resulting molded articles have better mechanical properties such as higher strength, higher hardness, lower compression set, better dimensional stability and higher heat deformation temperatures, or better electric insulation, chemical resistance, platability or heat resistance than molded articles prepared from the thermoplastic resin used.

Investigations of the present inventors have also shown that a resin composition in accordance with this invention which is thermosetting can be advantageously provided by the following embodiments.

(1) When the species (i) is used as the granular or powdery resin, its amount is preferably more than 0.5 part by weight, more preferably at least 0.6 part by weight, per part by weight of the thermoplastic resin.

(2) When the species (ii) is used as the granular or powdery resin, its proportion is preferably more than 2 parts by weight but does not exceed 6 parts by weight, more preferably more than 2 parts by weight but does not exceed 3 parts by weight, per part by weight of the thermoplastic resin. As the thermoplastic resin, there can be used those thermoplastic resins which have reactivity with the granular or powdery resin, such as polyamides, polyvinyl chloride and polyacetal resins. If the granular or powdery resin is used in amounts exceeding the aforesaid upper limits, it is difficult to obtain a molded article from the resulting resin composition.

(3) When a mixture of the species (i) and (ii) is used as the granular or powdery resin, it is advantageous to adjust its amount such that per part by weight of the thermoplastic resin, the total amount of the mixture is more than 0.5 part by weight, but does not exceed 20 parts by weight, and the amount, x, of the resin species (i) and the amount, y, of the resin species (ii) satisfy the expression $6-0.3x > y > 2-4x$.

The resin compositions of this invention which are thermosetting can be molded by methods generally used for the molding of thermosetting resins, for example by molding in a die. The resulting molded articles have higher toughness, strength and hardness, lower compression set, better dimensional stability, electrical insulation, chemical resistance, heat resistance and platability than those obtained from the granular or powdery resin alone.

As required, the resin composition of this invention may contain various fillers, for example fibrous materials such as glass fibers, carbon fibers or rock wool; granular or powdery materials such as carbon, silica, talc, alumina, silica-alumina, diatomaceous earth, calcium carbonate, calcium silicate, magnesium oxide, clay, antimony oxide, hollow microspheres, or powders of metals such as iron, nickel and copper; or organic materials such as wood flour, linter, pulp or polyamide fibers. These fillers may be included in an amount of not more than 30% by weight, preferably not more than 20% by weight, based on the total weight of the resin composition.

The resin composition of this invention which is thermoplastic can be produced by introducing the granular or powdery phenol-aldehyde resin, the thermoplastic resin and optionally fillers into a melt extruder either as such or after mixing them in the solid state in a mixer such as a V-type blender, and melt-mixing them in the melt extruder. The resin composition of this invention can be obtained there either as chips or pellets, or as a molded article.

It is also possible to feed a solid mixture of the aforesaid components of the resin composition of this invention which is thermoplastic or the aforesaid chips or pellets into a mold or an injection molding machine, and convert such a material into a molded article by molding in the mold or by injection molding.

The resin composition of this invention which is thermosetting may be converted to a molded article usually by feeding a solid mixture of its components in a mixer such as a V-type blender into a mold and molding it there. If desired, it is also possible to first form chips or pellets of the resin composition in a melt extruder adapted to rereduce the heat history of the resin composition, and then to convert the resulting chips or pellets into the desired molded article. The operating conditions for the mold usually include temperatures of 80° to 300° C. and periods of 0.1 to 10 hours and optionally pressures of 5 to 500 kg/cm².

By utilizing the various excellent properties mentioned above, molded articles prepared from the resin compositions of this invention can be suitably used as electric and electronic component parts such as printed circuit boards, switch boxes and circuit board for computers; casting molds for thermoplastic resins; electrolytic cells; gears, bearings and types; heat insulating boards or structural materials for internal combustion engines; interior and structural materials such as automotive or aircraft dashboards; and sealing materials such as packing gaskets for the opening and closing portions of refrigerators and tanks for chemicals.

Embodiment 2

The resin composition of this invention in accordance with embodiment 2 contains a rubbery elastic material in addition to the granular or powdery resin.

The rubbery elastic material is a material which exhibits so-called rubbery elasticity either as such or in the cured state. Such a rubbery elastic material is well known in the art, and includes, for example, natural rubber and synthetic rubbers such as polybutadiene, polyisoprene, copoly(butadiene-styrene), copoly(butadiene-acrylonitrile), copoly(ethylene-propylene), polyisobutylene, copoly(isobutylene-isoprene), polychloroprene, polyacrylate rubber, polysulfide, silicone rubbers, chlorinated polyethylene, fluorine rubber, chlorosulfonated polyethylene, and polyurethan.

Conveniently, these rubbery elastic materials are used in the uncured state.

Among the above examples of the rubbery elastic materials, copoly(butadiene-acrylonitrile), polyacrylate rubber, fluorine rubber, copoly(butadiene-styrene), polychloroprene, chlorinated polyethylene, chlorosulfonated polyethylene, copoly(ethylene-propylene), and silicone rubbers are preferred in this invention.

The resin composition of this invention containing the rubbery elastic material gives a cured product which has better heat resistance, abrasion resistance, adhesion, compression strength, hardness or tear strength than a resin composition containing a conventional phenol-aldehyde resin.

In the resin composition of this invention, the granular or powdery resin has a better action of curing or thickening rubber than a conventional phenol-aldehyde resin.

The mixing ratio of the elastic material and the granular or powdery resin in the resin composition of this invention differs depending upon the type of the elastic material or the properties of the resin, for example, its methylol group content, or the end use of the composition. Generally, the granular or powdery resin is used in an amount of not more than 2 parts by weight, preferably 0.03 to 2 parts by weight, especially preferably 0.05 to 1.5 part by weight, above all 0.1 to 1 part by weight, per part by weight of the rubbery elastic material.

In addition to the rubbery elastic material and the granular or powdery resin, the resin composition of this invention may contain various conventional additives for rubber compounds, such as vulcanizers, vulcanization aids, vulcanization accelerators, protective agents for rubber, processing agents for rubber, reinforcing agents, extenders and coloring agents.

Examples of the vulcanizers include sulfur- or oxime-type vulcanizers such as sulfur, selenium, tellurium, sulfur chloride, p,p'-dibenzoylquinone dioxime and p-quinonedioxime; and organic peroxides such as 1,1-bis(t-butyl)peroxy-3,3,5-trimethylcyclohexane, benzoyl peroxide, t-butylperoxyisopropyl carbonate, dicumyl peroxide, t-butylcumyl peroxide, methyl ethyl ketone peroxide, and cumyl hydroperoxide.

Examples of the vulcanization aids includes zinc oxide, lead white, calcium hydroxide, litharge, stearic acid, oleic acid, lauric acid, linseed oil, cottonseed fatty acid, zinc stearate, lead oleate, dibenzylamine, diphenylguanidine phthalate, dibutyl ammonium oleate, diethanolamine and monoethanolamine.

Examples of the vulcanization accelerators include guanidines such as diphenylguanidine, triphenylguanidine and diphenylguanidine phthalate; aldehyde and ammonia type accelerators such as hexamethylenetetramine, acetaldehyde and ammonia; amines or nitroso compounds such as an acetaldehyde/aniline mixture, an anhydrous formaldehyde/p-toluidine mixture, a butyraldehyde/ethylene polyamine mixture, or a condensation product of acrolein and an aromatic amine; thiazoles such as 2-mercaptobenzothiazole, dibenzothiazyl disulfide and cyclohexylbenzothiazyl sulfenamide; thioureas such as thiocarbanilide and trialkylthioureas; thio-acid salts and dithio-acid salts such as zinc butylxanthate, zinc dimethyldithiocarbamate, zinc isopropylxanthate, sodium diethyldithiocarbamate, palladium dimethyldithiocarbamate, copper dimethyldithiocarbamate and lead pentamethylenedithiocarbamate; thiurams such as tetramethylthiuram monosulfide, tetramethylthiuram disulfide and dipentamethylenethiuram tetrasulfide; and mixtures of two or more of the above-exemplified vulcanization accelerators.

The vulcanizers, vulcanization aids or vulcanization accelerators may each be included in an amount of preferably 0.001 to 0.1 part by weight per part by weight of the rubbery elastic material in the resin composition of this invention.

Examples of the protective agents for rubber include antioxidants such as N-phenyl-1-naphthylamine, p-(p-tolyl-sulfonylamide)diphenylamine, phenylisopropyl p-phenylenediamine, and p-phenylphenol; antiozonants such as p-phenylene diamine, 6-amino-2,2,4-trimethyl-2,2-dihydroqyinoline and nickel dibutyldithiocarbamate; crack inhibitors such as N-phenyl-2-naphthylamine and N,N'-diphenylethylenediamine; and inhibitors against the deleterious effects of copper, such as di-$\beta$-naphthyl p-phenylenediamine and Calgon.

Examples of the processing agents for rubber include plasticizers or softening agents such as various esters, ketones, aromatic hydrocarbons, alcohols, mineral and vegetable oils, and coal tar products; binders such as phenolic resins, coumarone-indene resin and terpene styrene-type resins; dispersing agents such as fatty acids, fatty acid soaps and amines; and combustion inhibitors such as trixylenyl phosphate and tricresyl phosphate.

Examples of the reinforcing agents include inorganic reinforcing agents such as carbon black, zinc oxide, clay, magnesium carbonate, various grades of silica, silicates, and calcium carbonate; and organic reinforcing agents such as asphaltic materials, phenolic resins, terpene resins, coumarone-indene resin, various natural fibers, and various synthetic and semi-synthetic fibers.

Examples of the extenders are clay, talc, chalk, barite, lithopone, magnesium carbonate, zinc oxide and caldium carbonate.

Examples of the coloring agents include inorganic pigments such as various carbon blacks, titanium white, zinc oxide, red iron oxide, iron blue, cobalt blue, yellow ocher, chrome green and chrome orange; and organic pigments such as phthalocyanine blue, Para Red, Hansa Yellow and orange lake.

The aforesaid rubber protecting agents, rubber processing agents, reinforcing agents, extenders or coloring agents are may be included in the resin composition of this invention in an amount of up to 1 part by weight per part by weight of the rubbery elastic material.

The resin composition of this invention according to embodiment 2 may be prepared by melt-mixing the rubbery elastic material, the granular or powdery resin and the various additives usually at a temperature of 70° to 150° C. using an open roll for example; or by mixing these material together with a solvent suitable for the rubbery elastic material, such as toluene, xylene, perchloroethylene, trichloroethylene, ketone, ether, alcohol, ethyl acetate, gasoline or light oil, and thereafter subjecting the mixture to a solvent-removing treatment.

During the melt mixing or the solvent mixing and the solvent removing treatment, the curing of the resin composition of this invention proceeds, but such a resin composition which has undergone curing reaction to some extent is also included within the resin composition of this invention.

Articles obtained by heat-treating the resin composition of this invention at a temperature of, for example, 100° to 200° C., such as oil seals, gaskets, packings, oil-resistant hoses, conveyor belts, rubber rolls, window frame rubbers, tires, diaphragms, electric component parts, shoe soles and shoe heels, have excellent mechanical properties such as excellent strength, high hardness, low compression set, and excellent dimensional stability, or excellent electrical insulation or heat resistance, which are desirable for the respective articles.

Embodiment 3

According to this embodiment, the resin composition of this invention is a curable resin composition comprising the granular or powdery phenol-aldehyde resin, and either another curable resin, or a filler material or both.

Heat-curable or thermosetting resin is preferably used as the curable resin. Examples include resol resins, novolak resins, epoxy resins, furane resins, melamine resins, urea resins, and unsaturated polyester resins. The resol, novolak, epoxy and furane resins are especially preferred. These curable resins may be used singly or as a mixture of two or more.

The filler material is included into the curable resin composition of this invention for various purposes. For example, for the purpose of strengthening a cured molded article prepared from it, or of imparting dimensional stability, heat resistance, fire retardancy, moldability or processability to the resin composition, filler materials which are usually used for such purposes can be used in this invention.

The filler material may be an inorganic or organic material, and may be granular or powdery or fibrous. Illustrative of such a filler material are fibrous inorganic materials such as glass fibers, carbon fibers and rock wool; carbon powder, silica, alumina, and silica-alumina; granular or powdery inorganic materials such as diatomaceous earth, calcium carbonate, calcium silicate, magnesium oxide, clay, antimony oxide, hollow microspheres, or powders of metals such as iron, nickel or copper; and organic materials such as wood flour, linter, pulp or polyamide fibers.

The heat-curable resin composition of this invention comprises the granular or powdery resin and one or both of the curable resin and the filler.

Strictly, the suitable mixing ratio of these components in the heat-curable resin composition of this invention varies depending upon the properties of the granular or powdery phenol-aldehyde resin used, for example whether it is heat-fusible or not, or upon the types of the curable resin and the filler materials. The resin composition of this invention may contain the curable resin in an amount of 10 to 90% by weight, preferably 16 to 80% by weight, more preferably 24 to 70% by weight, based on the total amount of the curable resin and the granular or powdery phenol-aldehyde resin.

The heat-curable resin composition of this invention may generally contain the filler material in an amount of 5 to 89% by weight, preferably 10 to 77% by weight, more preferably 15 to 63% by weight, based on the total amount of the filler and the granular or powdery phenol-aldehyde resin in the composition.

The heat-curable resin composition of this invention encompasses the following three embodiments.

According to a first embodiment, the resin composition comprises all of the three components, i.e. the granular or powdery phenol-aldehyde resin, the curable resin and the filler. The granular or powdery phenol-formaldehyde resin contains reactive methylol groups. Accordingly, a cured product obtained from the resin composition is believed to have such a structure that the filler material is dispersed in a matrix composed of a cured intimate mixture of the granular or powdery phenol-aldehyde resin and the curable resin. The powdery or granular phenol-aldehyde resin may be the heat-fusible species (i), the substantially heat-infusible species (ii) or a mixture of (i) and (ii). It is believed that where the heat-fusible species (i) is a major portion of the resin components, the particles of the granular or powdery resin are bonded to each other during heat molding as a result of melting and therefore are greatly disintegrated or form a continuous phase in the resulting cured article. On the other hand, it is believed that where the granular or powdery resin constitutes a minor portion of the resin component, the individual particles of the granular or powdery resin, whether it is the species (i) or (ii), are cured and dispersed within the cured matrix in the cured article like independent islands, and act like a filler.

The heat curable resin composition in accordance with the first embodiment comprises 10 to 85 parts by weight, preferably 20 to 75 parts by weight, above all 30 to 65 parts by weight, of the granular or powdery resin, 10 to 85 parts by weight, preferably 15 to 70 parts by weight, above all 20 to 55 parts by weight, of the curable resin, and 5 to 80 parts by weight, preferably 10 to 65 parts by weight, above all 15 to 50 parts by weight, of the filler material, the total amount of the three components being 100 parts by weight.

It is especially preferred in the first embodiment that the curable resin be a resol resin, a novolak resin or an epoxy resin, and the fiber be glass fibers.

According to a second embodiment, the resin composition of this invention comprises the granular or powdery phenol-aldehyde resin and the filler and is substantially free from the curable resin.

The granular or powdery resin may be the heat-fusible species (i) or a mixture of the heat-fusible species (i) and the substantially heat-infusible species (ii). In the case of the mixture of the species (i) and (ii), it is preferred that the species (i) be used in a larger amount than the species (ii) and its amount be at least 25% by weight based on the total weight of the granular or powdery resin and the filler material.

The heat-fusible species (i) of the granular or powdery resin used in this invention, even when molded singly under heat, can give a cured article having the inherent excellent properties such as excellent electrical properties of the cured phenolic resin. As stated hereinabove, it is extremely difficult to prepare a cured molded article from the resol resin alone, and the novolak resin can by itself give a cured molded article but its quality is inferior. In view of this fact, the present invention has brought about an innovative advance in the art in that the granular or powdery resin used in this invention can by itself give a feasible cured article easily within very short periods of time.

A cured article obtained from the resin composition in accordance with the second embodiment is of very uniform quality because its matrix is derived only from the granular or powdery resin (not containing the curable resin), and it has particularly excellent heat resistance and electrical insulation.

The heat-curable resin composition of this invention comprises 20 to 95 parts by weight, preferably 30 to 90 parts by weight, more preferably 40 to 85 parts by weight, of the granular or powdery resin, and 5 to 80 parts by weight, preferably 10 to 70 parts by weight, more preferably 15 to 60 parts by weight, of the filler material, the total weight of the two components being 100 parts by weight.

Preferably, the filler material used in the second embodiment is glass fibers, hollow microspheres, pulp, carbon powder, calcium carbonate or polyamide fibers.

According to a third embodiment, the resin composition of this invention comprises the granular or powdery phenol-aldehyde resin and the curable resin and is substantially free from the filler material. The granular or powdery phenol-aldehyde resin used in this embodiment may be the heat-fusible species (i), the substantially heat-infusible species (ii), or a mixture of the species (i) and (ii). The substantially heat-infusible species (ii) or a mixture of it with the species (i) is preferred. The substantially heat-infusible species (ii) is used in am amount of 5 to 90% by weight, preferably 10 to 80% by weight, above all 15 to 70% by weight, based on the total weight of the resin components.

The heat-curable resin composition according to the third embodiment comprises 10 to 90 parts by weight, preferably 20 to 80 parts by weight, more preferably 30 to 70 parts by weight, of the granular or powdery resin, and 10 to 90 parts by weight, preferably 20 to 80 parts by weight, more preferably 30 to 70 parts by weight, of the curable resin.

In the third embodiment, the curable resin is preferably a resol resin or a novolak resin.

Unlike the novolak resin, the granular or powdery phenol-aldehyde resin used in the heat-curable resin composition of this invention has very characteristic reactivity such that it can be cured without using a crosslinking agent such as hexamine (in this sense, this resin may be said to be self-curable). This characteristic reactivity is exhibited in the production of a cured article from the heat-curable resin composition of this invention. For example, the heat-fusible species of the granular or powdery resin reacts with the curable resin such as a novolak resin or a filler material such as polyamide fibers used at the time of the curing reaction and can by itself cure without a crosslinking agent. Hence, a homogeneous cured article cured to a very hard structure can be obtained.

When heated, the substantially heat-infusible species of the granular or powdery resin itself further undergoes curing while substantially maintaining its particulate form, and the same time reacts with the other curable resin at its interface. It, therefore, exhibits an excellent action as a filler in the cured product, and a very hard cured article of uniform quality is obtained.

The heat-curable resin composition can be produced by mixing the granular or powdery resin and the curable resin and/or the filler material by using a V-blender, for example, if they are solid substances. When a solvent solution of a curable resin such as a resol resin or a furan resin is used, the resin composition may be prepared by first mixing these materials in a kneader, a mixer, a roll, etc., and then removing the solvent.

The curable heat-curable resin composition of this invention may be converted to a cured article by heat-treating it at a temperature of, for example, 80° to 250° C., for 0.1 to 10 hours, and as required under an elevated pressure of 1 to 500 kg/cm$^2$. Usually, the resin composition is first molded and then heat-treated to obtain a cured product.

Cured articles obtained from the heat-curable resin compositions of this invention have better compression strength, chemical resistance, electrical properties such as electrical insulation, heat resistance or heat insulation than, for example, cured articles prepared from resin compositions containing conventional phenolic resins.

As required, the resin composition of this invention may contain known additives such as ultraviolet absorbers, heat stabilizers, coloring agents, plasticizers, curing agents, accelerators, lubricants and modifers.

The following examples illustrate the present invention more specifically.

The various properties given in the specification including the following examples are measured or defined as follows:

The various abbreviations used in the examples are as follows:

TT: tetramethylthiuram disulfide
DM: dibenzothiazyl sulfide
M: 2-mercaptobenzothiazole
22: mixture of M+TT
ALTAX: benzothiazyl disulfide
Litharge: PbO (acid acceptor)
Light process oil: a kind of oil
DDM: dodecylmercaptan
GMF: accelerator containing p-dinitrosobenzene
TAIC: allyl isocyanurate
DOP: dioctyl phthalate
TET: tetraethyltetramine 1. Content of particles having a specified particle diameter:

A portion weighing about 0.1 g was sampled from five different sites of one sample.

A part of each of the 0.1 g portions so sampled was placed on a slide glass for microscopic examination. The sample on the slide glass was spread to minimize accumulation of particles for easy observation.

The microscopic observation was made with regard to that part of the sample in which about 10 to about 50 primary particles and/or the secondary agglomerated particles thereof were present in the visual filed of an optical microscope usually having a magnification of 100 to 1,000. The sizes of all particles existing in the visual field of the optical microscope were read by a measure set in the visual field of the optical microscope and recorded.

The content (%) of particles having a size of, for example, 0.1 to 150$\mu$ can be calculated in accordance with the following equation.

$$\text{Content } (\%) = (N_1/N_o) \times 100$$

$N_o$: the total number of particles whose sizes were read in the visual field under the microscope, and
$N_1$: the number of those particles in $N_o$ which had a size of 0.1 to 150$\mu$.

For each sample, the average of values obtained from the five sampled portions was calculated.

2. Proportion of particles which passed through a Tyler mesh sieve:

About 10 g of a dried sample, if desired after lightly crumpled by hand, was accurately weighed. Over the course of 5 minutes, the sample was put little by little in a Tyler mesh sieve vibrator (the opening size of the sieve 200 mm in diameter; vibrating speed 200 rpm). After the end of addition, the sieve was vibrated further for 10 minuts. The proportion of the particles which passed through a 100 Tyler mesh sieve, for example, was calculated from the following equation.

(% by weight) = $[(\omega_o - \omega_1)/\omega_o] \times 100$ $\omega_o$: the amount of the sample put in the sieve (g),
$\omega_1$: the amount of the sample which remained on the 100 Tyler mesh sieve (g).

3. Free phenol content:

About 10 g of the sample which passed through the 100 Tyler mesh sieve was precisely weighed, and heat-treated under reflux for 30 minutes in 190 g of 100% methanol. The hat-treated product was filtered through a No. 3 glass filter. The filtrate was subjected to high-performance liquid chromatography to determine the phenol content of the filtrate. The free phenol content of the sample was determined from a calibration curve separately prepared.

The operating conditions of high-performance liquid chromatography were as follows:
Device: Model 6000A made by Waters Co., U.S.A.
Column carrier: $\mu$-Bondapak $C_{18}$
Column: ¼ inch in diameter and 1 foot in length
Column temperature: room temperature
Eluent: methanol/water (3/7 by volume)
Flow rate: 0.5 ml/min.
Detector: UV (254 nm), range 0.01 (1 mV)

The phenol content of the filtrate was determined from a separately prepared calibration curve (showing the relation between the phenol content and the height of a peak based on phenol).

4. Infrared absorption spectrum and absorption intensities (see accompanying FIGS. 1 and 2):

The infrared absorption spectrum of a sample prepared by a usual KBr tablet method was measured by means of an infrared spectrophotometer (Model 225 made by Hitachi Limited).

The absorption intensity at a specified wavelength was determined in the following way.

A base line is drawn tangent to a peak whose absorption intensity is to be determined in the measured infrared absorption spectral chart. Let the transmittance of the vertex of the peak be $t_p$ and the transmittance of the base line at the specified wavelength be $t_b$, then the absorption intensity D at the specified wavelength is given by the following equation.

D = log $(t_b/t_p)$

For example, the ratio of the absorption intensity of a peak at 890 cm$^{-1}$ to that of a peak at 1600 cm$^{-1}$ is given by the ratio of the respective absorption intensities determined by the above equation (i.e., $D_{890}/D_{1600}$).

5. Heat fusibility at 100° C.:

About 5 g of a sample which passed through a 100 Tyler mesh sieve was interposed between two 0.2 mm-thick stainless steel sheets, and the assembly was pressed under an initial pressure of 50 kg for 5 minutes by means of a hot press kept at 100° C. (a single acting compression molding machine manufactured by Shinto Kinzoku Kogyosho Co., Ltd.). The press was released, and the hot-pressed sample was taken out from between the two stainless steel sheets, and observed. When the sample so taken out was in the form of a flat plate as a result of melting or melt-adhesion, it was judged that the sample had fusibility. When no appreciable difference was noted after the hot pressing, the sample was determined to have infusibility.

6. Methanol solubility:

About 10 g of a sample was precisely weighed (the precisely measured weight is given by $W_o$), and heat-treated under reflux for 30 minutes in about 500 ml of 100% methanol. The mixture was filtered on a No. 3 glass filter. The sample remaining on the filter was washed with about 100 ml of methanol. Then, the sample remaining on the filter was dried at 70° C. for 2 hours. The weight of the dried sample was precisely weighed (the precisely measured weight is given by $W_1$). The solubility of the sample in methanol was calculated from the following equation.

Solubility in methanol
(wt%) = $[(W_o - W_1)/W_o] \times 100$

7. Bulk density:

A sample was poured into a 100 ml measuring cylinder (whose brim corresponded to a 150 ml indicator mark) from a height 2 cm above the brim of the measuring cylinder. The bulk density of the sample is defined by the following equation.

Bulk density (g/ml) = [W(g)/100(ml)]

W: the weight in grams of the sample per 100 ml.

8. Weight increase by acetylation

About 10 g of a dry sample was precisely weighed, and added to about 300 g of an acetylation bath consisting of 78% by weight of acetic anhydride, 20% by weight of acetic acid and 2% by weight of orthophosphoric acid. Then, the temperature was gradually raised from room temperature to 115° C. over the course of 45 minutes. The sample was further maintained at 115° C. for 15 minutes. Then, the bath was allowed to cool, and filtered on a No. 3 glass filter while being sucked by an aspirator carefully. The filtrate was fully washed with hot water on the glass filter, and finally washed with a small amount of cold methanol. Then, the residue on the glass filter was dried together with the glass filter in a dessicator at 70° C. for 2 hours, and allowed to stand for a day and night in a dessicator containing silica gel as a drying agent. The dry weight of the residue on the filter was precisely weighed.

The weight increase by acetylation, I, is given by the following equation.

I = $[(W_1 - W_o)/W_o] \times 100$ $W_o$: the precisely measured weight (g) of the dry sample before acetylation,
$W_1$: the precisely measure weight (g) of the dry sample after acetylation.

9. Hydroxyl value:

Measured in accordance with the method of measuring the hydroxyl value (General Testing Method 377, Commentary on the Standards of Cosmetic Materials, first edition, published by Yakuji Nipposha, 1975).

10. Compression strength:

Measured in accordance with JIS K-6911-1979.

11. Heat distortion temperature:

Measured on accorddance with JIS K-6717.

12. Volume inherent restistivity (ohms-cm):

Measured according to the method described in JIS K-6911-1979.

13. Hardness and tensile strength and elongation:

Measured by the methods described in JIS K-6301-1975.

14. Compression set:

Measured in accordance with the method described in JIS K-6301-1975 under the conditions: compression 25%, 70° C.×22 hours.

15. Flexural strength (kg/cm$^2$) and compression strength (kg/cm$^2$):

Measured in accordance with JIS K-6911-1979.

16. Heat resistant temperature:

A sample was heat-treated for 24 hours at various temperatures in a dryer. The highest temperature during these heat-treatment operations at which no crack or gas blister was observed in the samples is defined as the heat resistant temperature.

17. Heat conductivity (cal/cm sec °C.):

Measured in accordance with JIS A-1412-1968.

REFERENTIAL EXAMPLE 1

(1) In each run, a 2-liter separable flask was charged with 1,500 g of a mixed aqueous solution at 28° C. of hydrochloric acid and formaldehyde having each of the compositions shown in Table 1, and 62.5 g of an aqueous solution at 25° C. containing 80% by weight of phenol and 5% by weight of formaldehyde prepared from 98% by weight of phenol (the remaining 2% by weight being water), 37% formalin and water was added. The mixture was stirred for 20 seconds, and then left to stand for 60 minutes. During the 60-minute standing, the contents of the flask remained clear (Runs Nos. 1 and 20), or turned from a clear solution to a whitely turbid suspension (Runs Nos. 3, 9 and 18), or turned from a clear solution to a whitely turbid suspension which then turned pale pink (Runs Nos. 2, 4 to 8, 10 to 17, and 19). Microscopic observation showed that the pink-colored suspensions already contained spherical particles, agglomerated spherical particles, and a small amount of a powder. With occasional stirring, the contents of the separable flask were heated to 80° C. over the course of 60 minutes, and then maintained at 80° to 82° C. for 15 minutes to obtain a reaction product. The reaction product was washed with warm water at 40° to 45° C., treated in a mixed aqueous solution containing 0.5% by weight of ammonia and 50% by weight of methanol at 60° C. for 30 minutes, again washed with warm water at 40° to 45° C., and then dried at 80° C. for 2 hours. The properties of the reaction products obtained by using the aqueous solutions of hydrochloric acid and formaldehyde in various proportions are shown in Table 2.

(2) For comparison, the following experiment was carried out. A 1-liter separable flask was charged with 282 g of distilled phenol, 369 g of 37% by weight formalin and 150 g of 26% by weight aqueous ammonia and with stirring, the mixture was heated from room temperature to 70° C. over 60 minutes. Furthermore, the mixture was stirred at 70° to 72° C. for 90 minutes, and then allowed to cool. While 300 g of methanol was added little by little, the product was dehydrated by azeotropic distillation under a reduced pressure of 40 mmHg. As a solvent, 700 g of methanol was added, and the product was withdrawn as a yellowish brown clear solution of a resol resin.

When the solvent was removed from a part of the resulting resol resin under reduced pressure, vigorous foaming occurred and the resin was gelled. The gel was heat-cured under a nitrogen gas atmosphere at 160° C. for 60 minutes, and the resulting cured foam was pulverized to obtain a small amount of a powder which passed through a 100 Tyler mesh sieve. The heat-cured resol was very hard and extremely difficult to pulverize into a powder having a size of 100-mesh under even when various types of pulverizers or ball mills or a vibratory mill for fluorescent X-rays were used. The resulting heat-cured resol resin powder was treated with a mixed aqueous solution containing 0.5% by weight of ammonia and 50% by weight of methanol, washed with warm water, dehydrated and then dried under the same conditions as described in section (1) above. The properties of the resulting product are shown in Table 2 as Run No. 21.

A 1-liter separable flask was charged with 390 g of phenol, 370 g of 37% by weight formalin, 1.5 g of oxalic acid and 390 g of water, and with stirring, the mixture was heated to 90° C. over 60 minutes and heated with stirring at 90° to 92° C. for 60 minutes. Then, 1.0 g of 35% by weight hydrochloric acid was added, and the mixture was further heated with stirring at 90° to 92° C. for 60 minutes. The product was cooled by adding 500 g of water, and then the water was removed by a siphon. The residue was heated under a reduced pressure of 30 mmHg, and heated under reduced pressure at 100° C. for 3 hours and then at 180° C. for 3 hours. On cooling, a novolak resin was obtained as a yellowish brown solid having a softening temperature of 78° to 80° C. and a free phenol content, measured by liquid chromatography, of 0.76% by weight. It has a methanol solubility of 100% by weight.

The resulting novolak resin was pulverized and mixed with 15% by weight of hexamethylenetetramine. The mixture was heat-cured in a nitrogen gas at 160° C. for 120 minutes, pulverized in a ball mill, and then passed through a 100 Tyler mesh sieve. The resulting powder was treated with a mixed aqueous solution containing 0.5% by weight of ammonia and 50% by weight of methanol, washed with water, dehydrated and then dried under the same conditions as described above. The properties of the resulting product are shown in Table 2 as Run No. 22.

The novolak resin was melt-spun at 136° to 138° C. through a spinneret having 120 orifices with a diameter of 0.25 mm. The as-spun filaments having an average size of 2.1 denier were dipped in a mixed aqueous solution containing 1.8% by weight of hydrochloric acid and 18% by weight of formaldehyde at 20° to 21° C. for 60 minutes, heated to 97° C. over 5 hours, and then maintained at 97° to 98° C. for 10 hours. The resulting cured novolak fibers were treated with a mixed aqueous solution containing 0.5% by weight of ammonia and 50% by weight of methanol, washed with water, dehydrated and then dried under the same conditions as described above. The product was pulverized in a ball mill, and passed through a 100 Tyler mesh sieve. The properties of the resulting product are shown in Table 2 as Run No. 23.

(3) Table 1 shows the concentrations of hydrochloric acid and formaldehyde used and the total concentration of hydrochloric acid and formaldehyde, and the mole ratio of formaldehyde to phenol. Table 2 shows the contents of particles having a size of 1 to 50 microns, 1 to 100 microns, and 1 to 150 microns, respectively, the proportion of particles which passed through a 100 Tyler mesh sieve, the $D_{990-1015}/D_{1600}$ and $D_{890}/D_{1600}$ ratios of the resulting products, and the weight increase by acetylation of the products.

TABLE 1

| Run No. | Concentration (wt. %) HCl | Concentration (wt. %) Formaldehyde | Concentration (wt. %) Total | Mole ratio of formaldehyde to phenol |
|---|---|---|---|---|
| 1 | 3 | 1 | 4 | 1.1 |
| 2 | 3 | 25 | 28 | 23.8 |
| 3 | 5 | 5 | 10 | 4.9 |
| 4 | 5 | 10 | 15 | 9.6 |
| 5 | 5 | 22 | 27 | 20.9 |
| 6 | 7 | 30 | 37 | 28.5 |
| 7 | 10 | 6 | 16 | 5.8 |
| 8 | 10 | 20 | 30 | 19.1 |
| 9 | 12 | 3 | 15 | 2.8 |
| 10 | 15 | 5 | 20 | 4.9 |
| 11 | 15 | 25 | 40 | 23.8 |
| 12 | 18 | 10 | 28 | 9.6 |
| 13 | 20 | 7 | 27 | 16.8 |
| 14 | 22 | 4 | 26 | 4.0 |
| 15 | 22 | 17 | 39 | 16.2 |
| 16 | 25 | 6 | 31 | 5.8 |
| 17 | 25 | 25 | 50 | 23.8 |
| 18 | 28 | 3 | 31 | 2.8 |
| 19 | 28 | 7 | 35 | 6.8 |
| 20 | 33 | 1 | 34 | 1.1 |
| 21 | Heat cured resol resin | | | |
| 22 | Hexamine heat-cured novolak resin | | | |
| 23 | Cured novolak fibers | | | |

TABLE 2

| Run No. | Content (%) of particles having the following sizes 1–50μ | Content (%) of particles having the following sizes 1–100μ | Content (%) of particles having the following sizes 1–150μ | Proportion particles having a size of 100 mesh under (wt. %) | IR intensity ratio $D_{990-1015}/D_{1600}$ | IR intensity ratio $D_{890}/D_{1600}$ | Weight increase by acetylation (wt. %) |
|---|---|---|---|---|---|---|---|
| 1 | 1 (76) | 1 (100) | 1 (100) | 1 (83) | 0.35 | 0.10 | 8.6 |
| 2 | 3 (73) | 3 (100) | 3 (100) | 4 (79) | 0.45 | 0.11 | 19.5 |
| 3 | 13 (87) | 13 (100) | 13 (100) | 8 (75) | 0.42 | 0.11 | 21.7 |
| 4 | 50 | 89 | 96 | 62 | 0.86 | 0.18 | 25.4 |
| 5 | 53 | 97 | 100 | 63 | 4.82 | 0.73 | 27.8 |
| 6 | 12 (76) | 12 (100) | 12 (100) | 18 (84) | 6.68 | 1.02 | 30.6 |
| 7 | 61 | 98 | 100 | 63 | 0.23 | 0.10 | 25.7 |
| 8 | 83 | 100 | 100 | 78 | 2.36 | 0.58 | 33.5 |
| 9 | 61 | 92 | 100 | 61 | 0.21 | 0.14 | 26.3 |
| 10 | 83 | 100 | 100 | 76 | 0.25 | 0.11 | 28.1 |
| 11 | 63 | 81 | 100 | 61 | 4.83 | 0.46 | 30.5 |
| 12 | 99 | 100 | 100 | 98 | 1.52 | 0.40 | 32.8 |
| 13 | 99 | 100 | 100 | 91 | 0.83 | 0.25 | 31.4 |
| 14 | 69 | 94 | 100 | 69 | 0.26 | 0.17 | 24.7 |
| 15 | 54 | 75 | 92 | 71 | 2.16 | 0.64 | 29.9 |
| 16 | 84 | 98 | 100 | 79 | 0.37 | 0.12 | 28.5 |
| 17 | 10 (86) | 10 (94) | 10 (100) | 2 (73) | 4.26 | 0.13 | 41.3 |
| 18 | 50 | 87 | 96 | 62 | 0.27 | 0.10 | 23.8 |
| 19 | 59 | 93 | 100 | 69 | 0.44 | 0.10 | 27.6 |
| 20 | 2 (52) | 2 (95) | 2 (100) | 1 (61) | 0.23 | 0.10 | 19.7 |
| 21 | 17 | — | — | — | 0.12 | 0.09 | 9.9 |
| 22 | 58 | — | — | — | 5.47 | 0.07 | 18.7 |
| 23 | 39 | — | — | — | 0.87 | 0.23 | 22.6 |

In Runs Nos. 1, 2, 3, 6, 17 abd 20 shown in Table 1, a large amount of a sticky resin or a hard and large lumpy or plate-like mass formed at the bottom of the separable flask. In Runs Nos. 1, 2 and 20, only less than 49 g of a solid was obtained from 50 g of phenol used.

In Runs Nos. 1, 2, 3, 6, 17 and 20, the contents of particles having a size of 1 to 50 microns, 1 to 100 microns and 1 to 150 microns and the proportion of particles having a size of 100 mesh under shown in Table 2 are based on the entire solid including the sticky resin, lumpy mass and plate-like mass. The contents of these particles and the proportion of particles having a size of 100 mesh under based only on the granular and powdery product in these Runs are shown in the parentheses in Table 2.

REFERENTIAL EXAMPLE 2

Each of six 20-liter reaction vessels was charged with 10.2 to 11.7 kg of a mixed aqueous solution containing 20% by weight of hydrochloric acid and 11% by weight of formaldehyde so that the bath ratio was as shown in Table 3. With stirring at 23° C., a mixed aqueous solution containing 90% by weight of phenol and 3.7% by weight of formaldehyde was added in an amount of 1.8 kg, 1.5 kg, 0.9 kg, 0.7 kg, 0.4 kg, and 0.25 kg, respectively. The bath ratios were 7.3, 8.5, 13.5, 17.0, 28.9, and 45.6, respectively.

In all of these cases, continued stirring after addition of the mixed aqueous phenol solution resulted in the abrupt formation of white suspended particles in 40 to 120 seconds. The stirring was stopped as soon as the white suspended particles formed, and the suspension was left to stand for 3 hours. The temperature of the inside of the reaction system gradually rose, and the contents of the vessel gradually turned pale pink. In all of these runs, the formation of a slurry-like or resin-like product was observed in 30 minutes after the formation of the white suspended particles. The reaction mixture was washed with water with stirring. With stirring, the contents of the flask were heated to 75° C. over 2 hours, and then heated with stirring at 75° to 76° C. for 30 minutes. With the reaction mixture obtained in a system having a bath ratio of 7.3, a large amount of resin meltadhered to the stirring rod and the stirring became very difficult. In all runs, the contents of the reaction vessel turned from pale pink to pink and further to red during the temperature elevation.

The contents of the flask were then washed with water, treated in a mixed aqueous solution containing 0.1% by weight of ammonia and 55% by weight of methanol at 50° C. for 60 minutes, and washed with warm water at 80° C. for 60 minutes. The resulting granular or powdery product or lumpy mass was crumpled lightly by hand, and dried at 100° C. for 2 hours. After the drying, the product had a water content of less than 0.2% by weight. The resulting products are designated as samples of Runs Nos. 31, 32, 33, 34, 35 and 36 in the increasing order of the bath ratio.

Table 3 summarizes the maximum temperature reached of the reaction system from the initiation of the reaction to 3 hours after the formation of the white suspended particles; the yield of the reaction product; the presence or absence of spherical primary particles by microscopic observation; the proportion and bulk density of particles having a size of 100 Tyler mesh under in the reaction product; the heat fusibility at 100° C. of the reaction product; the elemental analysis values of the product; and the OH value of the product.

ature of the liquid gradually rose from 25° C., reached a maximum temperature of 35° to 36° C. in 16 to 17 minutes after the addition, and then dropped. The reaction mixture was allowed to stand at room temperature for 0.5 hour (Run No. 41), 1 hour (Run No. 42), 2 hours (Run No. 43), 6 hours (Run No. 44), 24 hours (Run No. 45), and 72 hours (Run No. 46), respectively, washed with water, treated in 1% by weight aqueous ammonia at 15° to 17° C. for 6 hours, washed with water, dehydrated, and finally dried at 40° C. for 6 hours.

Table 4 summarizes the proportion of particles which passed through a 100 Tyler mesh sieve, the $D_{990-1015}/D_{1600}$ ratio and $D_{890}/D_{1600}$ ratios, the methanol solubility and the free phenol content of the products.

The samples obtained in Runs Nos. 41 to 46 all fused in a heat fusibility test conducted at 100° C. for 5 minutes.

FIG. 1 shows an infrared absorption spectral chart of

TABLE 3

| Run No. | Bath ratio | Maximum temperature reached of the reaction system (°C.) | Yield (wt. %) | Proportion of the 100 mesh under particles (wt. %) | Bulk density of the 100 mesh under particles | Presence or absence of spherical primary particles | Heat-fusibility at 100 °C. | Elemental analysis (wt. %) | | | | OH value |
|---|---|---|---|---|---|---|---|---|---|---|---|---|
| | | | | | | | | C | H | O | N | |
| 31 | 7.3 | 39.5 | 110 | 29 | 0.25 | Little | Fused | 74.5 | 5.7 | 19.0 | 0.6 | 330 |
| 32 | 8.5 | 38.5 | 113 | 63 | 0.23 | Much | Infusible | 74.7 | 5.6 | 19.3 | 0.3 | 335 |
| 33 | 13.5 | 37.0 | 115 | 78 | 0.21 | Mostly | " | 75.0 | 5.7 | 20.0 | 0.2 | 360 |
| 34 | 17.0 | 36.5 | 118 | 91 | 0.20 | " | " | 75.1 | 5.7 | 19.1 | 0.1 | 373 |
| 35 | 28.9 | 35.5 | 118 | 98 | 0.19 | " | " | 76.3 | 5.7 | 18.7 | 0.0 | 385 |
| 36 | 45.6 | 35.0 | 117 | 97 | 0.19 | " | " | 75.7 | 5.7 | 18.3 | 0.0 | 377 |
| 21 | (Comparison: see Table 1) | | — | — | 0.67 | None | " | 78.7 | 5.7 | 14.7 | 0.7 | 235 |
| 22 | (Comparison: see Table 1) | | — | — | 0.50 | " | Fused | 78.1 | 6.0 | 13.7 | 2.3 | — |
| 23 | (Comparison: see Table 1) | | — | — | 0.27 | " | Infusible | 74.8 | 5.6 | 19.2 | 0.5 | 325 |

The OH value of the product obtained in Run No. 22 could not be measured because it fluctuated greatly.

In Run No. 31, a plate-like product and a lumpy product formed in a total amount of as large as about 70% based on the entire solid formed at the bottom of the flask, and only about 30% of the entire solid consisted of a granular or powdery product. But about 95% of the granular or powdery product passed through a 100 Tyler mesh sieve. The indication "little" for Run No. 31 is because the proportion of the granular or powdery product based on the entire solid was as small as about 30%. Hence, the method of Run No. 31 is not recommendable, but the resulting granular or powdery product is included within the granular or powdery resin used in this invention.

In Runs Nos. 31 to 36, almost all of the granular or powdery product consisted of particles having a size of 1 to 100 microns.

REFERENTIAL EXAMPLE 3

One thousand grams of a mixed aqueous solution at 25° C. containing 18% by weight of hydrochloric acid and 9% by weight of formaldehyde was put into each of six 1-liter separable flasks. The room temperature was 15° C. With stirring, 40 g of phenol diluted with 5 g of water was added at a time to the solution. In each run, the stirring was stopped in 50 seconds after the addition of the diluted solution of phenol. In 62 to 65 seconds after the stopping of the stirring, white suspended particles abruptly formed to give a milk-white product. The milk-white product gradually turned pink. The temperthe granular or powdery resin obtained in Run No. 44. FIG. 1 also illustrates the method of determining $t_p$ to $t_b$ required for obtaining the absorption intensity D. A base line is drawn across a certain peak, and $t_p$ and $t_b$ can be determined as illustrated at the wavelength of the peak.

TABLE 4

| Run No. | Proportion of particles which passed through a 100 Tyler mesh sieve (wt. %) | IR intensity ratio | | Methanol solubility (wt. %) | Free phenol content (ppm) |
|---|---|---|---|---|---|
| | | $D_{990-1015}/D_{1600}$ | $D_{890}/D_{1600}$ | | |
| 41 | 59 | 0.53 | 0.10 | 97 | 310 |
| 42 | 83 | 0.87 | 0.12 | 80 | 116 |
| 43 | 94 | 1.06 | 0.13 | 71 | 85 |
| 44 | 97 | 1.12 | 0.13 | 67 | 74 |
| 45 | 96 | 1.12 | 0.14 | 64 | 73 |
| 46 | 97 | 1.13 | 0.13 | 63 | 70 |

REFERENTIAL EXAMPLE 4

A 1000-liter reaction vessel equipped with a stirring rod was charged with 800 kg of a mixed aqueous solution at 18° C. containing 18.5% by weight of hydrochloric acid and 8.5% by weight of formaldehyde, and while the mixed aqueous solution was stirred, 36.4 kg of a 88% by weight aqueous solution of phenol at 20° C. was added. After the addition of all of the aqueous phenol solution, the mixture was stirred for 60 seconds. The stirring was then stopped, and the mixture was left to stand for 2 hours. In the reaction vessel, white suspended particles formed abruptly in 85 seconds after the addition of all of the aqueous phenol solution. The white suspended particles gradually turned pale pink, and the temperature of the suspension gradually rose to 34.5° C. and decreased. Thereafter, while the mixed aqueous solution in which the reaction product formed was stirred, a valve secured to the bottom of the reaction vessel was opened, and the contents were withdrawn and separated into the reaction product and the mixed aqueous solution of hydrochloric acid and formaldehyde by using a nonwoven fabric (Nomex, a tradename for a product of E. I. du Pont de Nemours & Co.). The reaction product was washed with water, dehydrated, dipped for a day and night in a 0.5% by weight aqueous solution of ammonia at 18° C., again washed with water, and dehydrated to give 44.6 kg of the reaction product having a water content of 15% by weight.

2.0 Kg of the reaction product so obtained was dried at 40° C. for 3 hours to give 1.7 kg of a sample (Run No. 47).

Table 5 shows the contents of 0.1-50 micron particles and 0.1-100 micron particles of the dried sample obtained, the proportion of particles which passed through a 100 mesh Tyler mesh sieve, the $D_{990-1015}/D_{1600}$ and $D_{890}/D_{1600}$ ratios, and the methanol solubility of the product.

TABLE 5

| Run No. | Content of 0.1–50 micron particles (%) | Content of 0.1–100 micron particles (%) | Proportion of particles which passed through a 100 Tyler mesh sieve (wt. %) | IR intensity ratio $D_{990-1015}/D_{1600}$ | $D_{890}/D_{1600}$ | Methanol solubility (wt. %) |
|---|---|---|---|---|---|---|
| 47 | 96 | 100 | 99 | 1.18 | 0.13 | 47 |

EXAMPLE 1

One part by weight of chips of 6-nylon (1013B, a tradename for a product of Ube Industries, Ltd.) was mixed with the granular or powdery resin obtained in Run No. 35 in an amount of 0, 0.015, 0.025, 0.04, 0.07, 0.15, 0.4 and 0.8 part by weight, respectively. The mixture was kneaded and extruded by an extruder (Type 3AGM, made by Sumitomo Heavy Industries, Ltd.), and cooled to form guts. The guts were converted into chips. The eight kinds of chips obtained were each extruded into a mold kept at 80° C. at a cylinder temperature of 250° C. to obtain eight kinds of molded articles each having a width of 5 cm, a length of 20 cm and a thickness of 0.5 cm (Runs Nos. 51 to 58).

Table 6 shows the flow of the mixed resin and the dispersibility of the granular or powdery resin during extrusion molding, and the heat distortion temperature, compression strength and volume inherent resistivity before or after boiling in water of each of the molded articles.

TABLE 6

| Run No. | Amount (parts by weight) of the product of Run No. 35 | Processability Flow of the resin | Dispersibility | Volume inherent resistivity (ohm-cm) Before boiling | After boiling | Compression strength (kg/mm²) | Heat distortion temperature (°C.) |
|---|---|---|---|---|---|---|---|
| 51 | 0 | Excellent | — | $10^{12}$ | $10^{9}$ | 8.7 | 65 |
| 52 | 0.015 | Excellent | Good | $10^{13}$ | $10^{11}$ | 10.1 | 73 |
| 53 | 0.025 | Excellent | Excellent | $10^{13}$ | $10^{11}$ | 11.5 | 84 |
| 54 | 0.04 | Excellent | Excellent | $10^{13}$ | $10^{12}$ | 13.7 | 95 |
| 55 | 0.07 | Excellent | Excellent | $10^{14}$ | $10^{13}$ | 14.3 | 101 |
| 56 | 0.15 | Excellent | Excellent | $10^{14}$ | $10^{13}$ | 15.1 | 112 |
| 57 | 0.4 | Excellent | Excellent | $10^{14}$ | $10^{13}$ | 15.2 | 137 |
| 58 | 0.8 | Good | Excellent | $10^{14}$ | $10^{13}$ | 14.5 | 154 |

EXAMPLE 2

One part by weight of a powder of 12-nylon (3035J, a tradename for a product of Ube Industries, Ltd.) was mixed with 0.3 part by weight of each of the products of Runs Nos. 12, 21, 22, and 23 and glass staples (10 microns in diameter and 2 mm in length). The resulting mixtures were molded into five types of molded articles (Runs Nos. 61 to 65) in accordance with the method described in Example 1.

Table 7 shows the moldability of each of the mixtures and the compression strength and the volume inherent resistivity before or after boiling in water of each of the molded articles.

TABLE 7

| Run No. | Material mixed | Moldability | Volume inherent resistivity (ohm-cm) Before boiling | After boiling | Compression strength (kg/mm²) |
|---|---|---|---|---|---|
| 61 | Product of Run No. 12 | Very good | $10^{14}$ | $10^{13}$ | 14.7 |
| 62 | Product of Run No. 21 | Non-uniformity in dispersion | $10^{13}$ | $10^{10}$ | 7.3 |
| 63 | Product of Run No. 22 | Much gas generated | $10^{12}$ | $10^{8}$ | 5.1 |
| 64 | Product of Run No. 23 | Great non-uniformity in dispersion | $10^{13}$ | $10^{9}$ | 7.2 |
| 65 | Glass staples | Great non-uniformity in dispersion | $10^{13}$ | $10^{8}$ | 7.6 |

EXAMPLE 3

One part by weight of each of a polyester resin (BELLPET EFG-6, a tradename for a product of Kanebo Synthetic Fibers Co., Ltd.), a polycarbonate resin (MAKROLON 3100, a tradename for a product of Bayer AG), a polyethylene resin (Hizex 2000, a tradename for a product of Mitsui Petrochemical Industries, Ltd.), nylon-66 (Nylon 2020, a tradename for a product of Ube Industries, Ltd.) and a vinyl chloride resin (RYULON 7001, a tradename for a product of Tekkosha Co., Ltd.) was mixed with 0.45 part by weight of the product of Run No. 44. The mixture was melted at a temperature of 150° to 300° C., and then cooled and cut. One hundred grams of each of the resulting samples was divided into ten equal portions, and treated for 5 minutes under a pressure of 100 to 500 kg/cm$^2$ in a mold heated in advance to 100° to 250° C. between hot presses, to obtain ten molded articles (width 13 mm, thickness 5.2–6.8 mm, length 100 mm) from each of the samples (Runs Nos. 71 to 75).

Table 8 shows the heat distortion temperature and combustibility (match test by contact with the flame of a match for 10 seconds) of each of the molded products as the average properties of the ten samples in each Run. For comparison, molded articles were produced similarly from the various resins alone, and the results are also shown in Table 8 (Runs Nos. 76 to 80).

TABLE 8

| Run No. | Resin used | Heat deformation temperature (°C.) | Combustibility by a match test |
|---|---|---|---|
| | Invention | | |
| 71 | Polyester resin | 135 | Self-extinguishing |
| 72 | Polycarbonate resin | 160 | Flame retardant |
| 73 | Polyethylene resin | 95 | Burning very slow |
| 74 | Nylon-66 resin | 145 | Self-extinguishing |
| 75 | Vinyl chloride resin | 105 | Flame-retardant, carbonized |
| | Comparison | | |
| 76 | Polyester resin | 70 | Burning slow |
| 77 | Polycarbonate resin | 130 | Self-extinguishing |
| 78 | Polyethylene resin | 55 | Burning slow |
| 79 | Nylon-66 resin | 70 | Burning slow |
| 80 | Vinyl chloride resin | 70 | Self-extinguishing |

EXAMPLE 4

One part by weight of a powder of 12-nylon (3035J, a tradename for a product of Ube Industries, Ltd.) was mixed with 1, 3 or 10 parts by weight of the product of Run No. 47, and the mixture was treated under a pressure of 300 kg/cm$^2$ for 20 minutes in a mold heated in advance to 150° to 170° C. between hot presses to produce ten molded plates (width 13 mm, thickness 0.5–0.6 mm, length 100 mm) in each of Runs Nos. 81 to 83 as shown in Table 9. For comparison, ten molded plates were prepared from a powder of 12-nylon alone under the same conditions as above except that a mold heated to 150° C. was used (Run No. 84).

Table 9 shows the heat shrinkage residual ratio of each molded sheet upon standing for 30 minutes in a desiccator at 200° C. in the air, the heat fusibility of each plate when it was maintained in an atmosphere of nitrogen gas at 500° C. for 10 minutes, and the volume inherent resistivity of each molded plate before and after boiling in water.

TABLE 9

| Run No. | Product of Run No. 47 (parts by weight) | Heat shrinkage residual ratio (%) | Heat fusibility | Volume inherent resistivity (ohm-cm) Before boiling | After boiling |
|---|---|---|---|---|---|
| | | Invention | | | |
| 81 | 1 | 95.4 | Heat-infusible | $10^{14}$ | $10^{13}$ |
| 82 | 3 | 98.6 | Heat-infusible | $10^{14}$ | $10^{14}$ |
| 83 | 10 | 99.5 | Heat-infusible | $10^{14}$ | $10^{14}$ |
| | | Comparison | | | |
| 84 | 0 | No shape retention | Fused | $10^9$ | $10^8$ |

REFERENTIAL EXAMPLE 5

(1) A 2-liter separable flask was charged with 1.5 kg of a mixed aqueous solution at 25° C. of hydrochloric acid and formaldehyde in the various concentrations shown in Table 10, and while the mixed aqueous solution was stirred, 125 g of a mixed aqueous solution at 25° C. containing 20% by weight of phenol, 20% by weight of urea and 14.6% by weight of formaldehyde prepared from 98% phenol (the remaining 2& by weight being water), urea, 37% by weight formalin and water was added. The mixture was then stirred for 15 minutes, and thereafter left to stand for 60 minutes. During the 60-minute standing, the contents of the separable flask remained clear (Runs Nos. 101 and 120 in Table 10), or turned from a clear solution to a whitely turbid suspension and remained whitely turbid (Runs Nos. 103, 109 and 118 in Table 10), or turned from a clear solution to a whitely turbid suspension and gave a white precipitate (Runs Nos. 102, 104–108, 110–117, and 119). By microscopic observation, this white precipitate was found to contain spherical particles, an agglomerated mass of spherical particles, and a small amount of a powder. Then, with occasional stirring, the contents of the separable flask were heated to 80° C. over 60 minutes and then maintained at 80° to 82° C. for 15 minutes to obtain a reaction product. The reaction product was washed with warm water at 40° to 45° C., treated at 60° C. for 30 minutes in a mixed aqueous solution containing 0.5% by weight of ammonia and 50% by weight of methanol, again washed with warm water at 40° to 45° C., and then dried at 80° C. for 2 hours. The properties of the reaction products are shown in Table 11.

(2) Table 10 summarizes the concentrations of hydrochloric acid and formaldehyde used, the total concentration of hydrochloric acid and formaldehyde, the proportion of the weight of the HCl-formaldehyde solution based on the total weight of the phenol and urea, and the mole ratio of formaldehyde to phenol+urea. Table 11 summarizes the contents of particles having a size of 0.1 to 50 microns and 0.1 to 100 microns respectively, the amount of particles which passed through a 150 Tyler mesh sieve, and the $D_{960-1020}/D_{1450-1500}$, $D_{1280-1360}/D_{1450-1500}$ and $D_{1580-1650}/D_{1450-1500}$ ratios of the resulting products.

TABLE 10

| Run No. | Concentrations of the HCl—formaldehyde (wt. %) | | | Proportion of the weight of the HCl—HCHO bath based on the total amount of phenol and urea (wt. %) | | Mole ratio of total HCHO to the mixture of phenol and urea |
|---|---|---|---|---|---|---|
| | HCl | HCHO | Total | HCl | HCHO | |
| 101 | 3 | 1 | 4 | 90 | 30 | 1.6 |
| 102 | 3 | 28 | 31 | 90 | 840 | 21.2 |
| 103 | 5 | 2 | 7 | 150 | 60 | 2.3 |
| 104 | 5 | 10 | 15 | 150 | 310 | 8.1 |
| 105 | 5 | 22 | 27 | 150 | 660 | 16.8 |
| 106 | 7 | 30 | 37 | 210 | 900 | 22.6 |
| 107 | 10 | 7 | 17 | 300 | 210 | 5.9 |
| 108 | 10 | 18 | 28 | 300 | 540 | 13.9 |
| 109 | 12 | 3 | 15 | 360 | 90 | 3.0 |
| 110 | 15 | 5 | 20 | 450 | 150 | 4.5 |
| 111 | 15 | 22 | 37 | 450 | 660 | 16.8 |
| 112 | 18 | 10 | 28 | 540 | 300 | 8.1 |
| 113 | 20 | 7 | 27 | 600 | 210 | 5.9 |
| 114 | 22 | 4 | 26 | 660 | 120 | 3.8 |
| 115 | 22 | 17 | 39 | 660 | 510 | 13.2 |
| 116 | 25 | 6 | 31 | 750 | 180 | 5.2 |
| 117 | 25 | 25 | 50 | 750 | 750 | 19.0 |
| 118 | 28 | 3 | 31 | 780 | 790 | 2.6 |
| 119 | 28 | 7 | 35 | 780 | 210 | 5.9 |
| 120 | 33 | 1 | 35 | 990 | 30 | 1.6 |
| 21 | Heat-cured product of resol | | | | | |
| 22 | Hexamine heat-cured product of novolak | | | | | |
| 23 | Cured novolak fibers | | | | | |

TABLE 11

| Run No. | Content of particles with a size of 0.1–50 microns (%) | Content of particles with a size of 0.1–100 microns (%) | Proportion of particles which passed through a 150 Tyler mesh sieve (wt. %) | IR intensity ratio | | |
|---|---|---|---|---|---|---|
| | | | | $D_{1580-1650}/D_{1450-1500}$ | $D_{1280-1360}/D_{1450-1500}$ | $D_{960-1020}/D_{1450-1500}$ |
| 101 | 13 (86) | 13 (100) | 13 (87) | 0.31 | 0.29 | 0.10 |
| 102 | 6 (45) | 6 (58) | 6 (52) | 0.46 | 0.53 | 0.53 |
| 103 | 32 (91) | 32 (98) | 32 (93) | 0.73 | 0.46 | 0.14 |
| 104 | 56 | 78 | 65 | 1.67 | 0.73 | 0.45 |
| 105 | 38 | 47 | 58 | 1.41 | 0.86 | 0.47 |
| 106 | 7 (18) | 7 (39) | 7 (66) | 1.36 | 0.75 | 0.48 |
| 107 | 99 | 99 | 93 | 1.34 | 0.88 | 0.31 |
| 108 | 90 | 99 | 88 | 1.26 | 0.97 | 0.38 |
| 109 | 78 | 85 | 72 | 1.18 | 0.65 | 0.29 |
| 110 | 92 | 100 | 87 | 1.29 | 0.96 | 0.23 |
| 111 | 43 | 87 | 68 | 1.16 | 0.85 | 0.37 |
| 112 | 100 | 100 | 100 | 1.37 | 1.10 | 0.29 |
| 113 | 100 | 100 | 100 | 1.26 | 1.08 | 0.26 |
| 114 | 72 | 77 | 66 | 1.38 | 0.54 | 0.19 |
| 115 | 50 | 76 | 76 | 1.54 | 0.97 | 0.56 |
| 116 | 84 | 96 | 81 | 1.49 | 0.66 | 0.31 |
| 117 | 10 (63) | 10 (68) | 10 (73) | 1.01 | 0.78 | 0.64 |
| 118 | 38 | 69 | 65 | 1.34 | 0.47 | 0.19 |
| 119 | 46 | 75 | 69 | 1.14 | 0.77 | 0.32 |
| 120 | 7 (18) | 7 (49) | 7 (64) | 0.75 | 0.39 | 0.12 |
| 21 | 17 | — | — | 0.22 | 0.10 | 0.03 |
| 22 | 58 | — | — | 0.50 | 0.13 | 3.73 |
| 23 | 39 | — | — | 0.15 | 0.08 | 0.14 |

In Runs Nos. 101, 102, 106, 117 and 120 in Table 10, a large amount of a sticky resin, a hard large lumpy or plate-like mass formed at the bottom of the separable flasks.

In Runs Nos. 101, 102 and 120, only less than 49 g of a solid was obtained from 25 g of phenol and 25 g of urea used.

The contents of particles having a size of 0.1–50 microns and 0.1–100 microns and the proportion of particles which passed the 150 Tyler mesh sieve given in Table 11 for Runs Nos. 101, 102, 103, 106, 117 and 120 are based on the entire solid including the sticky resin, lumpy mass and plate-like mass. The contents of these and the proportion of the particles which passed through and 150 Tyler mesh sieve, based on the granular or powdery product alone in the resulting solid, are given in the parentheses in Table 11.

FIG. 2 shows an infrared absorption spectral chart of the granular or powdery product obtained in Run No. 112, and also illustrates how to determine $t_p$ and $t_b$, which are required in obtaining the absorption intensity D, from the infrared absorption spectral chart. A base line is drawn across a certain peak, and $t_p$ and $t_b$ can be determined at the wavelength of the peak as illustrated.

REFERENTIAL EXAMPLE 6

Ten kilograms of a mixed aqueous solution containing 18% by weight of hydrochloric acid and 11% by weight of formaldehyde was put in each of six 20-liter reaction vessels in a room kept at a temperature of 21° to 22° C. While the mixed aqueous solution was stirred at 23° C., a mixed aqueous solution containing 30% by weight of phenol, 20% by weight of urea and 11% by weight of formaldehyde was added in an amount of 3.34 kg, 2.66 kg, 1.60 kg, 1.06 kg, 0.74 kg, and 0.45 kg, respectively. The bath ratio at this time was 7.0, 8.5, 13.5, 20.0, 28.0, and 45.0, respectively. In all runs, when the stirring was continued after the addition of the mixed aqueous solution containing phenol, the mixture abruptly became whitely turbid in 10 to 60 seconds. The stirring was stopped as soon as the mixture became whitely turbid. The mixture was then left to stand for 3 hours. The temperature of the mixture gradually rose, and in 30 minutes after it became whitely turbid, the formation of a white slurry-like or resin-like product was observed. With stirring, the reaction mixture was washed with water. With the reaction mixture obtained at a bath ratio of 7.0, a large amount of a resinous hardened product melt-adhered to the stirring rod, and the stirring became very difficult.

The contents of the reaction vessel were treated in a 0.3% by weight aqueous solution of ammonia at 30° C.

for 2 hours with slow stirring, washed with water, and dehydrated. The resulting granular or powdery product or mass was lightly crumpled by hand, and dried at 40° C. for 3 hours. After drying, the products had a water content of less than 0.5% by weight. The contents of the vessels are designated as Runs Nos. 131, 132, 133, 134, 135 and 136 in the increasing order of the bath ratio.

Table 12 summarizes the maximum temperature reached of the reaction system during the time from the initiation of the reaction to 3 hours after the reaction system became whitely turbid, the yield of the reaction product, the presence or absence of spherical primary particles by microscopic observation, the proportion of particles which passed through a 150 Tyler mesh sieve, the bulk density of the particles which passed through the 150 Tyler mesh sieve, the heat fusibility of the reaction product at 100° C., the methanol solubility of the product, and the free phenol content of the product.

Almost 100% of each of the granular or powdery products obtained in Runs Nos. 131 to 136 consisted of particles having a particle size of 0.1 to 100 microns.

REFERENTIAL EXAMPLE 7

A 2-liter separable flask was charged with 1,250 g of a mixed aqueous solution at 24° C. containing 20% by weight of hydrochloric acid and 8% by weight of formaldehyde, and while it was stirred, a solution of each of the phenols shown in Table 13 and each of the nitrogen compounds shown in Table 13 diluted to a concentration of 20 to 80% by weight with 37% by weight formalin was added so that the total amount of the phenol and the nitrogen-containing compound became 50 g. As soon as the solution containing the phenol and the nitrogen-containing compound were added, the mixture became turbid, and in some Runs, instantaneously turned white, pink or brown. In 10 seconds after the

TABLE 12

| Run No. | Bath ratio | Maximum temperature of the reaction system reached (°C.) | Yield (wt. %) | Proportion of particles which passed through a 150 Tyler mesh sieve (wt. %) | Bulk density of the 150 Tyler mesh under particles (g/cc) | Presence or absence of spherical primary particles | Flexibility at 100° C. | Methanol solubility (wt. %) | Free phenol content (ppm) |
|---|---|---|---|---|---|---|---|---|---|
| 131 | 7.0 | 39.5 | 100 | 11 | 0.19 | Little | Melt-adhered | 83.8 | 150 |
| 132 | 8.5 | 39.0 | 113 | 56 | 0.16 | Much | " | 67.7 | 50 |
| 133 | 13.5 | 38.0 | 124 | 88 | 0.14 | Mostly | " | 60.4 | 35 |
| 134 | 20.0 | 36.5 | 128 | 100 | 0.12 | " | " | 53.6 | 30 |
| 135 | 28.0 | 36.0 | 128 | 100 | 0.11 | " | " | 54.4 | 25 |
| 136 | 45.0 | 36.0 | 129 | 99 | 0.11 | " | " | 52.6 | 25 |
| 21 | (Comparison; see Table 1) | — | — | | 0.62 | None | Infusible | Not more than 1 | Below 5 |
| 22 | (Comparison; see Table 1) | — | — | | 0.46 | " | Melt adhered | 1.6 | Below 5 |
| 23 | (Comparison; see Table 1) | — | — | | 0.24 | " | Infusible | Not more than 1 | Below 5 |

In Table 12, the free phenol contents in Runs Nos. 21, 22 and 23 are values measured with regard to resol and novolak resins before heat-curing and are indicated in the parentheses.

In Run No. 131 shown in Table 12, a sticky resin and a lumpy mass formed in an amount of about 80% based on the entire solid formed at the bottom of the flask, and the proportion of the resulting granular or powdery product was only about 20% based on the entire solid. About 85% of such granular or powdery product passed through a 100 Tyler mesh sieve. The "little" in the column of the presence or absence of spherical primary particles indicated in Table 12 for Run No. 131 was because the proportion of the granular or powdery product based on the entire solid product was as small as about 20%. Hence, the method of Run No. 131 cannot be recommended as a manufacturing method, but the resulting granular or powdery product sufficiently has the properties of the granular or powdery product suitably used in this invention.

addition of the solution, the stirring was stopped. After the stopping of the addition, the mixture was allowed to stand for 60 minutes. Again with stirring, it was heated to 75° C. over 30 minutes, and maintained at 73° to 76° C. for 60 minutes. The reaction product was washed with water, treated at 45° C. for 60 minutes in a mixed aqueous solution containing 0.3% by weight of ammonia and 60% by weight of methanol, washed with water, and finally dried at 80° C. for 3 hours.

Table 13 summarizes the types and proportions of the phenol and the nitrogen-containing compound used, the concentrations of the phenol and the nitrogen-containing compound in the formalin-diluted solution, the color of the reaction product observed 60 minutes after the addition of the resulting diluted solution, the yield of the reaction product based on the total amount of the phenol and the nitrogen-containing compound, the content of particles having a size of 0.1 to 50 microns in the reaction product, the proportion of particles which passed through a 150 Tyler mesh sieve, the $D_{960-1020}/D_{1450-1500}$ ratio, and the heat resistance of the product.

TABLE 13

| Run No. | Proportion of the materials used (wt.) | | Concentration of the material in the diluted solution (wt. %) | Color of the reaction product (60 minutes after addition) |
|---|---|---|---|---|
| | Phenol | Nitrogen-containing compound | | |
| 137 | Phenol 100 | Urea | 0 | 80 | Pink |
| 138 | Phenol 97 | Urea | 3 | " | " |

TABLE 13-continued

| Run No. | | | | | |
|---|---|---|---|---|---|
| 139 | Phenol 94 | Urea | 6 | " | " |
| 140 | Phenol 75 | Urea | 25 | 50 | Pale pink |
| 141 | Phenol 55 | Urea | 45 | 40 | White color |
| 142 | Phenol 35 | Urea | 64 | 30 | " |
| 143 | Phenol 25 | Urea | 75 | 20 | " |
| 144 | Phenol 10 | Urea | 90 | 20 | " |
| 145 | Phenol 50 | N,N'—dimethylolurea | 50 | " | " |
| 146 | Phenol 75 | Aniline | 25 | 80 | Reddish brown |
| 147 | Phenol 50 | Melamine | 50 | " | White |
| 148 | Phenol 50 | Urea | 50 | 40 | " |
| 149 | Phenol 50 | Urea | 50 | " | Red |
| 150 | Phenol/resorcinol (= 34/33) | Urea | 33 | 40 | Red |
| 151 | Phenol/t-butylphenol (= 40/20) | Urea | 40 | " | Brown |
| 152 | Phenol 50 | Urea/melamine (= 25/25) | | 50 | White |
| 21 | | Heat-cured resol resin | | | |
| 22 | | Hexamine heat-cured novolak resin | | | |
| 23 | | Cured novolak fibers | | | |

| Run No. | Yield (wt. %) | Contents of the particles having a size of 0.1 to 50 microns (%) | Proportion of particles which passed through a 150 Tyler mesh sieve (wt. %) | IR intensity ratio $D_{1580-1650}/D_{1450-1500}$ | IR intensity ratio $D_{1280-1350}/D_{1450-1500}$ | IR intensity ratio $D_{960-1020}/D_{1450-1500}$ | Heat resistance test (°C.) |
|---|---|---|---|---|---|---|---|
| 137 | 118 | 91 | 98 | 0.25 | 0.18 | 0.44 | 750 |
| 138 | 108 | 90 | 98 | 0.27 | 0.18 | 0.31 | 420 |
| 139 | 112 | 97 | 100 | 0.57 | 0.21 | 0.30 | 280 |
| 140 | 128 | 100 | 100 | 1.24 | 0.95 | 0.19 | 200 |
| 141 | 132 | 100 | 100 | 1.32 | 1.10 | 0.29 | " |
| 142 | 115 | 100 | 100 | 1.37 | 1.08 | 0.29 | " |
| 143 | 76 | 100 | 100 | 1.37 | 0.99 | 0.30 | " |
| 144 | 31 | 100 | 100 | 1.24 | 0.96 | 0.27 | " |
| 145 | 105 | 94 | 100 | 1.19 | 0.88 | 0.38 | " |
| 146 | 101 | 82 | 88 | 1.21 | 1.03 | 0.20 | " |
| 147 | 86 | 100 | 96 | 1.15 | 0.75 | 0.28 | " |
| 148 | 109 | 100 | 100 | 1.31 | 1.02 | 0.27 | " |
| 149 | 100 | 72 | 83 | 1.33 | 0.99 | 0.26 | " |
| 150 | 132 | 91 | 94 | 1.25 | 0.99 | 0.25 | 200 |
| 151 | 84 | 96 | 96 | 1.16 | 0.96 | 0.19 | " |
| 152 | 102 | 95 | 100 | 1.24 | 1.01 | 0.30 | " |
| 21 | | | 17 | 0.22 | 0.10 | 0.03 | 720 |
| 22 | | | 58 | 0.50 | 0.13 | 3.73 | 610 |
| 23 | | | 39 | 0.15 | 0.08 | 0.14 | 740 |

REFERENTIAL EXAMPLE 8

Each of six 1-liter separable flasks was charged with 1,000 g of a mixed aqueous solution at 18° C. containing 18% by weight of hydrochloric acid and 9% by weight of formaldehyde. The room temperature was 15° C. While the solution was stirred, 15 g of urea was dissolved in it, and then 25 g of a mixed diluted solution containing 80% by weight of phenol and 5% by weight of formaldehyde was added at a time. Ten seconds after the addition of the diluted solution, the stirring was stopped, and the solution was left to stand. In all Runs, the solution abruptly became whitely turbid in 18 to 19 seconds after the stopping of the stirring, and the formation of a milk-white product was observed. The temperature of the solution gradually rose from 18° C., and reached a peak at 31°–32° C. in 5 to 7 minutes after the addition of the diluted solution of phenol, and then decreased. The flask was left to stand at room temperature for 0.5 hour (Run No. 161), 1 hour (Run No. 162), 3 hours (Run No. 163), 6 hours (Run No. 164), 24 hours (Run No. 165), and 72 hours (Run No. 166), respectively, after the addition of the diluted phenol solution. Then, the contents of the flask were treated in a 0.75% by weight aqueous solution of ammonia at 15° to 17° C. for 3 hours, washed with water, dehydrated, and finally dried at 40° C. for 6 hours.

Table 14 summarizes the proportion of particles which passed through a 150 Tyler mesh sieve, the $D_{960-1020}/D_{1450-1500}$ ratio, the methanol solubility, and the free phenol content of the resulting dried products. The samples obtained in Runs Nos. 161 to 166 all melt-adhered in a fusibility test conducted at 100° C. for 5 minutes.

TABLE 14

| Run No. | Standing time at room temperature (hours) | Proportion of particles which passed through a 150 Tyler mesh sieve (wt. %) | Methanol solubility (wt. %) | IR intensity ratio ($D_{960-1020}/D_{1450-1500}$) | Free phenol content (ppm) |
|---|---|---|---|---|---|
| 161 | 0.5 | 63 | 99.5 | 0.13 | 280 |
| 162 | 1 | 87 | 97.8 | 0.17 | 70 |
| 163 | 3 | 95 | 85.7 | 0.24 | 45 |
| 164 | 6 | 100 | 63.4 | 0.29 | 30 |

TABLE 14-continued

| Run No. | Standing time at room temperature (hours) | Proportion of particles which passed through a 150 Tyler mesh sieve (wt. %) | Methanol solubility (wt. %) | IR intensity ratio ($D_{960-1020}/D_{1450-1500}$) | Free phenol content (ppm) |
|---|---|---|---|---|---|
| 165 | 24 | 100 | 40.2 | 0.29 | 20 |
| 166 | 72 | 98 | 35.6 | 0.31 | 15 |

REFERENTIAL EXAMPLE 9

A 1000-liter reaction vessel equipped with a stirring rod was charged with 800 kg of a mixed aqueous solution at 22.5° C. containing 18.5% by weight of hydrochloric acid and 8.5% by weight of formaldehyde, and while the mixed aqueous solution was stirred, 40 kg of a mixed aqueous solution at 20° C. containing 20% by weight of phenol, 10% by weight of hydroquinone and 20% by weight of urea was added.

After adding all of the phenol solution, the mixture was stirred for 20 seconds. The stirring was stopped, and the mixture was left to stand for 2 hours. In the reaction vessel, white suspended particles abruptly formed in 35 seconds after the addition of all of the phenol solution. A white granular product gradually formed, and the temperature of the suspension gradually rose to 35.5° C. and then decreased. The mixed aqueous solution in which the reaction product formed was again stirred, and a valve secured to the bottom of the reaction vessel was opened to withdraw the contents. By using a nonwoven fabric of Nomex (a tradename for a product of E. I. du Pont de Nemours & Co.), the contents were separated into the reaction product and the mixed aqueous solution of hydrochloric acid and formaldehyde. The resulting reaction product was washed with water, dehydrated, dipped for a day and night in a 0.5% by weight aqueous solution of ammonia at 18° C., again washed with water, and dehydrated to give 29.9 kg of the reaction product having a water content of 15% by weight.

2.0 kg of the reaction product thus obtained was dried at 40° C. for 3 hours to give 1.7 kg of a sample (Run No. 167).

Table 15 gives the contents of particles having a size of 0.1 to 50 microns and particles having a size of 0.1 to 100 microns determined by microscopic observation of the resulting dried sample, the proportion of particles which passed through a 150 Tyler mesh sieve, and the methanol solubility of the product.

TABLE 15

| Run No. | Content of 0.1-50 micron particles (%) | Content of 0.1-100 micron particles (%) | Proportion of particles 150 mesh under (wt. %) | Methanol solubility (wt. %) |
|---|---|---|---|---|
| 167 | 100 | 100 | 99 | 58 |

EXAMPLE 5

One part by weight of chips of 6-nylon (1013B, a tradename for product of Ube Industries, Ltd.) was mixed with the granular or powdery resin obtained in Run No. 135 in an amount of 0, 0.015, 0.025, 0.04, 0.07, 0.15, 0.4 and 0.8 part by weight, respectively. The mixture was kneaded and extruded by an extruder (Type 3AGM, made by Sumitomo Heavy Industries, Ltd.), and cooled to produce guts. The guts were each converted to chips. Eight kinds of chips obtained were each molded in a mold kept at 80° C. at a cylinder temperature of 250° C. to give eight kinds of molded articles each having a width of 5 cm, a length of 20 cm and a thickness of 0.5 cm (Runs Nos. 151 to 158).

Table 16 summarizes the flow of the mixed resin and the dispersibility of the granular or powdery resin during extrusion molding, and the compression strength and the volume inherent resistivity before or after boiling in water of each of the molded articles.

TABLE 16

| Run No. | Amount (parts by weight) of the product of Run No. 135 | Processability Flow of the resin | Processability Dispersibility | Molded article Volume inherent resistivity (ohm-cm) Before boiling | Molded article Volume inherent resistivity (ohm-cm) After boiling | Compression strength (kg/mm²) |
|---|---|---|---|---|---|---|
| 171 | 0 | Excellent | — | $10^{12}$ | $10^{9}$ | 8.7 |
| 172 | 0.015 | Excellent | Good | $10^{12}$ | $10^{10}$ | 9.5 |
| 173 | 0.025 | Excellent | Excellent | $10^{12}$ | $10^{11}$ | 11.3 |
| 174 | 0.04 | Excellent | Excellent | $10^{13}$ | $10^{12}$ | 13.2 |
| 175 | 0.07 | Excellent | Excellent | $10^{13}$ | $10^{13}$ | 15.6 |
| 176 | 0.15 | Excellent | Excellent | $10^{14}$ | $10^{14}$ | 17.8 |
| 177 | 0.4 | Excellent | Excellent | $10^{14}$ | $10^{14}$ | 17.0 |
| 178 | 0.8 | Good | Excellent | $10^{14}$ | $10^{13}$ | 15.1 |

EXAMPLE 6

One part by weight of a powder of 12-nylon (3035B, a tradename for a product of Ube Industries, Ltd.) was mixed with 0.3 part by weight of each of the products obtained in Runs Nos. 112, 140, 147 and 150, the products (cured products) obtained in Runs Nos. 21 to 23, and glass staples (10 microns in diameter, and 2 mm in length). Each of the mixtures was molded as in Example 5 to give 8 kinds of molded articles (Runs Nos. 170 to 186).

Table 17 shows the volume inherent resistivity before and after boiling in water and compression strength of the molded products, and the moldability of the mixed resin.

TABLE 17

| Run No. | Material mixed | Moldability | Volume inherent resistivity (ohm-cm) | | Compression strength (kg/mm$^2$) |
|---|---|---|---|---|---|
| | | | Before boiling | After boiling | |
| 179 | Product of Run No. 112 | Very good | 10$^{14}$ | 10$^{13}$ | 13.8 |
| 180 | Product of Run No. 140 | Very good | 10$^{14}$ | 10$^{14}$ | 14.9 |
| 181 | Product of Run No. 147 | Very good | 10$^{14}$ | 10$^{13}$ | 12.6 |
| 182 | Product of Run No. 150 | Very good | 10$^{14}$ | 10$^{13}$ | 13.1 |
| 183 | Product of Run No. 21 | Non-uniformity in dispersion | 10$^{13}$ | 10$^{10}$ | 7.3 |
| 184 | Product of Run No. 22 | Much gas generated | 10$^{12}$ | 10$^{8}$ | 5.1 |
| 185 | Product of Run No. 23 | Great non-uniformity in dispersion | 10$^{13}$ | 10$^{9}$ | 7.2 |
| 186 | Glass staples | Great non-uniformity in dispersion | 10$^{13}$ | 10$^{8}$ | 7.6 |

EXAMPLE 7

One part by weight of each of a polyester resin (BELLPET EFG-6, a tradename for a product of Kanebo Synthetic Fibers Co., Ltd.), a polycarbonate resin (MAKROLON 3100, a tradename for a product of Bayer AG), a polyethylene resin (Hizex 2000, a tradename for a product of Mitsui Petrochemical Industries, Ltd.), nylon-66 (Nylon 2020, a tradename for a product of Ube Industries, Ltd.) and a vinyl chloride resin (RYULON 7001, a tradename for a product of Tekkosha Co., Ltd.) was mixed with 0.45 part by weight of the product of Run No. 164. The mixture was melted at a temperature of 150° to 300° C., and then cooled and cut. One hundred grams of each of the resulting samples was divided into ten equal portions, and treated for 5 minutes under a pressure of 100 to 500 kg/cm$^2$ in a mold heated in advance to 100° to 250° C. between hot presses to obtain ten molded articles (width 13 mm, thickness 5.2–6.8 mm, length 100 mm) from each of the samples (Runs Nos. 187 to 191) shown in Table 18.

Table 18 shows the heat distortion temperature and combustibility (match test by contact with the flame of a match for 10 seconds) of each of the molded products as the average properties of the ten samples in each Run. For comparison, molded articles were produced similarly from the various resins alone and the results are also shown in Table 18 (Runs Nos. 192 to 196).

TABLE 18

| Run No. | Resin used | Heat deformation temperature (°C.) | Combustibility by a match test |
|---|---|---|---|
| *Invention* | | | |
| 187 | Polyester resin | 140 | Self-extinguishing |
| 188 | Polycarbonate resin | 175 | Flame-retardant, carbonized |
| 189 | Polyethylene resin | 90 | Burning very slow |
| 190 | Nylon-66 resin | 155 | Flame-retardant, carbonized |
| 191 | Vinyl chloride resin | 120 | Flame-retardant, carbonized |
| *Comparison* | | | |

TABLE 18-continued

| Run No. | Resin used | Heat deformation temperature (°C.) | Combustibility by a match test |
|---|---|---|---|
| 192 | Polyester resin | 70 | Burning slow |
| 193 | Polycarbonate resin | 130 | Self-extinguishing |
| 194 | Polyethylene resin | 55 | Burning slow |
| 195 | Nylon-66 resin | 70 | Burning slow |
| 196 | Vinyl chloride resin | 70 | Self-extinguishing |

EXAMPLE 8

One part by weight of a powder of 12-nylon (3035J, a tradename for a product of Ube Industries, Ltd.) was mixed with 1, 3 or 10 parts by weight of the product of Run No. 167, and the mixture was treated under a pressure of 300 kg/cm$^2$ for 20 minutes in a mold heated in advance to 150° to 170° C. between hot presses to produce ten molded plates (width 13 mm, thickness 0.5–0.6 mm, length 100 mm) in each of Runs Nos. 197 to 199 as shown in Table 19. For comparison, ten molded plates were prepared from a powder of 12-nylon alone under the same conditions as above except that a mold heated to 120° C. was used (Run No. 200).

Table 19 shows the heat shrinkage residual ratio of each of the molded plates upon standing for 30 minutes in a desiccator at 200° C. in the air, the heat fusibility of each molded plate when it was maintained in a nitrogen atmosphere at 500° C. for 10 minutes, and the compression strength of each molded plate.

TABLE 19

| Run No. | Product of Run No. 167 (parts by weight) | Heat shrinkage residual ratio (%) | Heat fusibility | Compression strength (kg/mm$^2$) |
|---|---|---|---|---|
| *Invention* | | | | |
| 197 | 1 | 96.8 | Heat-infusible | 15.2 |
| 198 | 3 | 99.0 | Heat-infusible | 16.4 |
| 199 | 10 | 99.3 | Heat-infusible | 19.7 |
| *Comparison* | | | | |
| 200 | 0 | No shape retention | Fused | 8.6 |

EXAMPLE 9

Ten kinds of mixtures were prepared by mixing (1) 100 parts by weight of Neoprene W (a tradename for a product of Showa Neoprene Co., Ltd.), 5 parts by weight of zinc oxide, 4 parts by weight of highly active magnesia, 3 parts by weight of light process oil, 1 part by weight of stearic acid, 3 parts by weight of an accelerator (22) and 30 parts by weight of SRF black with (2) the granular or powdery resin obtained in Run No. 12 in an amount of 0, 1, 3, 5, 10, 50, 100, 150, 200, and 250 parts by weight, respectively.

To each of the ten mixtures was added 2 times its amount of trichloroethylene to dissolve it. The solution was fully stirred, and the solvent was removed under a reduced pressure of 30 mmHg. The resulting residue was cut to a size of 1 to 3 mm, placed in a mold (120 mm×150 mm) heated in advance to 170° C., pressed while degassing, and finally hot-pressed for 30 minutes under a pressure of 100 kg/cm² to give rubber sheets (Runs Nos. 251 to 260) shown in Table 20.

Table 20 summarizes the amount of the resin mixed; the thickness, hardness, compression set, tensile strength, tensile elongation and volume inherent resistivity of the molded articles; and the hardness, tensile strength and tensile elongation of the molded articles after heat-treatment at 170° C. for 24 hours.

Table 21 summarizes the types of the fillers used, and their blendability, and the tensile strength and elongation of each of the sheets; and the shrinkage and tensile strength retention of the sheets heat-treated at 180° C. for 24 hours.

TABLE 21

| Run No. | Type of the filler | Blendability | Tensile strength (kg/cm²) | Elongation (%) | After heat-treatment at 180° C. for 24 hours | |
|---|---|---|---|---|---|---|
| | | | | | Shrinkage (%) | Strength retention (%) |
| 261 | None | — | 73 | 420 | 4.1 | 95 |
| 262 | Run No. 12 | Very good | 97 | 124 | 1.4 | 156 |
| 263 | Run No. 44 | Very good | 91 | 154 | 1.2 | 168 |
| 264 | Run No. 47 | Very good | 93 | 147 | 1.3 | 165 |
| 265 | Run No. 21 | Fair | 86 | 340 | 1.7 | 91 |
| 266 | Run No. 22 | Good | 62 | 380 | 3.4 | 108 |
| 267 | Run No. 23 | Fair | 84 | 176 | 2.6 | 113 |
| 268 | Wood flour | Slightly poor | 55 | 280 | 3.1 | 75 |

EXAMPLE 11

One hundred parts by weight of each of the various rubbers shown in Table 22 was kneaded with 20 parts

TABLE 20

| Run No. | Amount of the resin mixed (parts by weight) | Molded article | | | | | | After heat-treatment at 170° C. for 24 hours | | |
|---|---|---|---|---|---|---|---|---|---|---|
| | | Thickness (mm) | Hardness (°) | Compression set (%) | Tensile strength (kg/cm²) | Elongation (%) | Volume resistivity (Ω-cm) | Hardness (°) | Tensile strength (kg/cm²) | Elongation (%) |
| 251 | 0 | 1.1 | 70 | 16.3 | 73 | 370 | 6.2 × 10¹¹ | 78 | 62 | 106 |
| 252 | 1 | 1.1 | 76 | 17.2 | 74 | 390 | 6.1 × 10¹¹ | 79 | 55 | 85 |
| 253 | 3 | 1.2 | 79 | 8.9 | 82 | 260 | 1.1 × 10¹² | 83 | 86 | 105 |
| 254 | 5 | 1.2 | 80 | 6.2 | 87 | 210 | 5.6 × 10¹² | 87 | 91 | 93 |
| 255 | 10 | 1.3 | 83 | 5.3 | 105 | 170 | 1.3 × 10¹³ | 90 | 116 | 74 |
| 256 | 50 | 1.3 | 88 | 3.4 | 126 | 110 | 5.6 × 10¹³ | 95 | 144 | 58 |
| 257 | 100 | 1.3 | 90 | 3.0 | 101 | 80 | 7.8 × 10¹³ | 96 | 120 | 51 |
| 258 | 150 | 1.5 | 90 | 2.8 | 85 | 46 | 8.6 × 10¹³ | 97 | 93 | 22 |
| 259 | 200 | 1.7 | 89 | 3.7 | 31 | 25 | 2.1 × 10¹⁴ | 94 | 54 | 13 |
| 260 | 250 | 2.0 | 81 | 6.8 | 8 | 15 | 5.4 × 10¹³ | 83 | 11 | 7 |

EXAMPLE 10

While 100 parts by weight of nitrile rubber (Hycar OR25, a tradename for a product of Japanese Zeon Co., Ltd.), 5 parts by weight of zinc oxide, 1.5 parts by weight of stearic acid, 1.5 parts by weight of Altax, 3 parts by weight of pine tar and 40 parts by weight of carbon black were kneaded on an open roll at 95° C., 10 parts by weight of each of the products of Runs Nos. 12, 44, 47, 21, 22 and 23 and wood flour was added. They were fully mixed and extruded into a rubber sheet. The sheet obtained was heat-treated at 170° C. under a pressure of 1 to 2 kg/cm² for 3 hours. The resulting rubber sheets so heat-treated had a thickness of 1.0 to 1.1 mm and are designated as samples of Runs Nos. 261 to 268 in the above-mentioned order of the fillers used.

by weight of carbon black and the various compounding agents indicated in Table 24 at 50° to 110° C. using an open roll. The kneaded mixture was extruded into a sheet form, and heat-treated at a temperature of 160° C. under a pressure of 0 to 1 kg/cm² for 5 hours (16 hours in the case of fluorine rubber) to give various rubber sheets having a thickness of 0.9 to 1.1 mm.

Table 22 summarizes the type of the rubbers used, the types and amounts of the compounding agents, the hardness and tensile strength of each of the rubber sheets obtained, and the hardness, strength retention and shrinkage of each of the rubber sheets after heat-treatment at 150° C. for 24 hours.

The granular resin shown in the table was the one obtained in Run No. 35 in Referential Example 2.

TABLE 22

| Run No. | Type of rubber (tradename) | Amount of the granular resin (parts by weight) | Types and amounts (parts) of the compounding agents | Rubber sheet | | After heat-treatment at 150° C. for 24 hours | | |
|---|---|---|---|---|---|---|---|---|
| | | | | Hardness (°) | Tensile strength (kg/cm²) | Hardness (°) | Strength retention (%) | Shrinkage (%) |
| 271 | Natural rubber | 0 | Zinc oxide (5), stearic acid (1) | 30 | 36 | 75 | 62 | 8.7 |
| 272 | Natural rubber | 30 | Accelerator M (1), accelerator TT (1), sulfur (2) | 76 | 74 | 98 | 105 | 4.4 |
| 273 | Nitrile rubber | 0 | Zinc oxide (5), | 61 | 68 | 67 | 96 | 2.8 |

TABLE 22-continued

| Run No. | Type of rubber (tradename) | Amount of the granular resin (parts by weight) | Types and amounts (parts) of the compounding agents | Rubber sheet Hardness (°) | Tensile strength (kg/cm²) | After heat-treatment at 150° C. for 24 hours Hardness (°) | Strength retention (%) | Shrinkage (%) |
|---|---|---|---|---|---|---|---|---|
|  | (Hycar OR) |  | stearic acid (1), pine tar (3) |  |  |  |  |  |
| 274 | Nitrile rubber (Hycar OR) | 30 | Accelerator DM (1), sulfur (2) | 88 | 66 | 94 | 153 | 1.4 |
| 275 | Butyl rubber (GRI-50) | 0 | Zinc oxide (5), stearic acid (1), GMF (4) | 63 | 68 | 69 | 89 | 3.7 |
| 276 | Butyl rubber (GRI-50) | 30 | Lead oxide (5), sulfur (1) | 81 | 71 | 85 | 146 | 1.9 |
| 277 | Chlorinated polyethylene (ELASLEN 401A) | 0 | Litharge (15), DOP (10), accelerator 22 (4) | 72 | 61 | 81 | 102 | 2.4 |
| 278 | Chlorinated polyethylene (ELASLEN 401A) | 30 | TAIC (3), perhexa 3M-40 (5) | 83 | 72 | 87 | 140 | 1.4 |
| 279 | Chloroprene (Neoprene W) | 0 | Zinc oxide (5), stearic acid (1), magnesia (4) | 76 | 80 | 94 | 96 | 1.8 |
| 280 | Chloroprene (Neoprene W) | 30 | Light process oil (1), accelerator 22 (1) | 89 | 78 | 93 | 121 | 0.4 |
| 281 | Chlorosulfonated polyethylene (Hypalon 40) | 0 | Litharge (1.5), magnesia (10), Tetron A (1) | 76 | 76 | 83 | 100 | 2.9 |
| 282 | Chlorosulfonated polyethylene (Hypalon 40) | 30 | Rosin ester (2) | 84 | 85 | 87 | 128 | 1.1 |
| 283 | Fluorine rubber (VITON B) | 0 | Magnesia (10), TET (2) | 55 | 58 | 58 | 100 | 1.7 |
| 284 | Fluorine rubber (VITON B) | 30 |  | 78 | 54 | 81 | 135 | 0.9 |
| 285 | Styrene-butadiene rubber (JSR 1502) | 0 | Zinc oxide (5), stearic acid (1), | 77 | 67 | 87 | 85 | 5.6 |
| 286 | Styrene-butadiene rubber (JSR 1502) | 30 | accelerator DM (1.5), accelerator TT (1), sulfur (2) | 86 | 65 | 94 | 109 | 3.3 |

EXAMPLE 12

Ten kinds of mixtures were prepared by mixing (1) 100 parts by weight of Neoprene W (a tradename for a product of Showa Neoprene Co., Ltd.), 5 parts by weight of zinc oxide, 4 parts by weight of highly active magnesia, 3 parts by weight of light process oil, 1 part by weight of stearic acid, 3 parts by weight of an accelerator (22) and 30 parts by weight of SRF black with (2) the granular or powdery resin obtained in Run No. 112 in an amount of 0, 1, 3, 5, 10, 50, 100, 150, 200, and 250 parts by weight, respectively.

To each of the ten mixtures was added 2 times its amount of trichloroethylene to dissolve it. The solution was fully stirred, and the solvent was removed under a reduced pressure of 30 mmHg. The resulting residue was cut to a size of 1 to 3 mm, placed in a mold (120 mm × 150 mm) heated in advance to 170° C., pressed while degassing, and finally hot-pressed for 30 minutes under a pressure of 100 kg/cm² to give rubber sheets (Runs Nos. 368 to 377) shown in Table 23.

Table 23 summarizes the amount of the resin mixed; the thickness, hardness, compression set, tensile strength, tensile elongation and volume inherent resistivity of the molded articles; and the hardness, tensile strength, and tensile elongation of the molded articles after heat-treating at 200° C. for 8 hours.

TABLE 23

| Run No. | Amount of the resin mixed (parts by weight) | Molded article Thickness (mm) | Hardness (°) | Compression set (%) | Tensile strength (kg/cm²) | Elongation (%) | Volume resistivity (Ω-cm) | After heat-treatment at 200° C. for 8 hours Hardness (°) | Tensile strength (kg/cm²) | Elongation (%) |
|---|---|---|---|---|---|---|---|---|---|---|
| 368 | 0 | 1.1 | 76 | 16.3 | 73 | 370 | $6.2 \times 10^{11}$ | 81 | 48 | 40 |
| 369 | 1 | 1.1 | 76 | 15.9 | 69 | 360 | $5.8 \times 10^{11}$ | 80 | 36 | 35 |
| 370 | 3 | 1.1 | 79 | 9.6 | 81 | 310 | $1.0 \times 10^{12}$ | 84 | 83 | 75 |
| 371 | 5 | 1.1 | 80 | 7.1 | 84 | 280 | $7.8 \times 10^{12}$ | 86 | 87 | 90 |
| 372 | 10 | 1.2 | 82 | 4.8 | 101 | 220 | $1.9 \times 10^{13}$ | 88 | 107 | 125 |
| 373 | 50 | 1.3 | 85 | 3.3 | 118 | 160 | $3.7 \times 10^{13}$ | 90 | 132 | 110 |
| 374 | 100 | 1.3 | 88 | 2.6 | 105 | 130 | $4.8 \times 10^{13}$ | 92 | 111 | 85 |
| 375 | 150 | 1.4 | 89 | 2.6 | 82 | 65 | $7.4 \times 10^{13}$ | 95 | 96 | 40 |
| 376 | 200 | 1.5 | 89 | 3.9 | 47 | 30 | $9.6 \times 10^{13}$ | 94 | 51 | 25 |
| 377 | 250 | 1.8 | 78 | 7.4 | 11 | 20 | $6.7 \times 10^{13}$ | 87 | 15 | 10 |

EXAMPLE 13

While 100 parts by weight of nitrile rubber (Hycar OR25, a tradename for a product of Japanese Zeon Co., Ltd.), 5 parts by weight of zinc oxide, 1.5 parts by weight of stearic acid, 1.5 parts by weight of Altax, 3 parts by weight of pine par, 1 part by weight of an accelerator (DM) and 2 parts by weight of sulfur, and 40 parts by weight of carbon black were kneaded on an open roll at 95° C., 40 parts by weight of each of the products of Runs Nos. 113, 134, 140, 147, 150, 163, 167, 21, 22 and 23 and wood flour was added as a filler. They were fully mixed and extruded into a rubber sheet. The sheet obtained was heat-treated at 170° C. under a pressure of 1 to 2 kg/cm² for 3 hours. The resulting rubber sheets so heat-treated had a thickness of 1.0 to 1.2 mm and are designated as samples of Runs Nos. 379 to 389 in the order of the fillers used, and Run No. 379 in which no filler was used.

Table 24 summarizes the types of the fillers used, and their blendability, and the tensile strength elongation of each of the sheets; and the shrinkage and tensile strength retention of the sheets heat-treated at 180° C. for 24 hours.

EXAMPLE 14

One hundred parts by weight of each of the various rubbers shown in Table 25 was kneaded with 20 parts by weight of carbon black and the various compounding agents indicated in Table 25 at 50° to 110° C. using an open roll. The kneaded mixture was extruded into a sheet form, and heat-treated at a temperature of 160° C. under a pressure of 1 to 2 kg/cm² for 5 hours (16 hours in the case of fluorine rubber) to give various rubber sheets having a thickness of 0.9 to 1.2 mm.

Table 25 summarizes the types of the rubbers used, the types and amounts of the compounding agents, the hardness and tensile strength of each of the rubber sheets obtained, and the hardness, strength retention and shrinkage of each of the rubber sheets after heat-treatment at 150° C. for 24 hours.

The granular resin shown in the table was the one obtained in Run No. 164 in Referential Example 8.

TABLE 24

| Run No. | Type of the filler | Blend-ability | Tensile strength (kg/cm²) | Elongation (%) | After heat-treatment at 180° C. for 24 hours | |
|---|---|---|---|---|---|---|
| | | | | | Shrinkage (%) | Strength retention (%) |
| 378 | None | — | 73 | 420 | 4.1 | 95 |
| 379 | Product of Run No. 113 | Very good | 86 | 175 | 1.6 | 141 |
| 380 | Product of Run No. 134 | Very good | 105 | 140 | 1.3 | 165 |
| 381 | Product of Run No. 140 | Very good | 87 | 180 | 1.7 | 146 |
| 382 | Product of Run No. 147 | Very good | 93 | 190 | 1.7 | 151 |
| 383 | Product of Run No. 150 | Very good | 84 | 170 | 1.5 | 146 |
| 384 | Product of Run No. 163 | Very good | 112 | 130 | 1.1 | 160 |
| 385 | Product of Run No. 167 | Very good | 108 | 105 | 1.2 | 174 |
| 386 | Powder of Run No. 21 | Fair | 86 | 340 | 1.7 | 91 |
| 387 | Product of Run No. 22 | Good | 62 | 380 | 3.4 | 108 |
| 388 | Powder of Run No. 23 | Fair | 84 | 176 | 2.6 | 113 |
| 389 | Wood flour | Slightly poor | 55 | 280 | 3.1 | 75 |

TABLE 25

| Run No. | Type of rubber (tradename) | Amount of the granular resin (parts by weight) | Types and amounts (parts) of the compounding agents | Rubber sheet | | After heat-treatment at 150° C. for 24 hours | | |
|---|---|---|---|---|---|---|---|---|
| | | | | Hardness (°) | Tensile strength (kg/cm²) | Hardness (°) | Strength retention (%) | shrinkage (%) |
| 390 | Natural rubber | 0 | Zinc oxide (5), stearic acid (1), accelerator M (1), accelerator TT (1), sulfur (2) | 30 | 36 | 75 | 62 | 8.7 |
| 391 | Natural rubber | 30 | | 71 | 87 | 94 | 113 | 4.6 |
| 392 | Nitrile rubber (Hycar OR) | 0 | Zinc oxide (5), stearic acid (1), pine tar (3), accelerator DM (1), sulfur (2) | 61 | 68 | 67 | 96 | 2.8 |
| 393 | Nitrile rubber (Hycar OR) | 30 | | 84 | 79 | 91 | 147 | 1.3 |
| 394 | Butyl rubber (GRI-50) | 0 | Zinc oxide (5), stearic acid (1), GMF (4), lead oxide (5), sulfur (1) | 63 | 68 | 69 | 89 | 3.7 |
| 395 | Butyl rubber (GRI-50) | 30 | | 77 | 85 | 84 | 133 | 1.6 |
| 396 | Chlorinated polyethylene (ELASLEN 401A) | 0 | Litharge (15), DOP (10), accelerator 22 (4), TAIC (3), perhexa 3M-40 (5) | 72 | 61 | 81 | 102 | 2.4 |
| 397 | Chlorinated polyethylene (ELASLEN 401A) | 30 | | 80 | 92 | 82 | 155 | 1.2 |
| 398 | Chloroprene (Neoprene W) | 0 | Zinc oxide (5), stearic acid (1), magnesia (4), light process oil (1), accelerator 22 (1) | 76 | 80 | 94 | 96 | 1.8 |
| 399 | Chloroprene (Neoprene W) | 30 | | 83 | 96 | 89 | 136 | 0.6 |
| 400 | Chlorosulfonated polyethylene (Hypalon 40) | 0 | Litharge (1.5), magnesia (10), Tetron A (1), rosin ester (2) | 76 | 76 | 83 | 100 | 2.9 |
| 401 | Chlorosulfonated | 30 | | 80 | 102 | 86 | 147 | 1.3 |

TABLE 25-continued

| Run No. | Type of rubber (tradename) | Amount of the granular resin (parts by weight) | Types and amounts (parts) of the compounding agents | Rubber sheet Hardness (°) | Tensile strength (kg/cm²) | After heat-treatment at 150° C. for 24 hours Hardness (°) | Strength retention (%) | shrinkage (%) |
|---|---|---|---|---|---|---|---|---|
| 402 | polyethylene (Hypalon 40) Fluorine rubber (Viton B) | 0 | Magnesia (10), TET (2) | 55 | 58 | 58 | 100 | 1.7 |
| 403 | Fluorine rubber (Viton B) | 30 | | 73 | 76 | 79 | 154 | 0.9 |
| 404 | Styrene-butadiene rubber (JRS 1502) | 0 | Zinc oxide (5), stearic acid (1), accelerator TT (1), sulfur (2) | 77 | 67 | 87 | 85 | 5.6 |
| 405 | Styrene-butadiene rubber (JSR 1502) | 30 | | 81 | 80 | 91 | 120 | 2.5 |

EXAMPLE 15

Sixty parts by weight of the product of Run No. 43 (as a matrix) was mixed with 40 parts by weight of each of glass staples (Run No. 551) cut to a size of 3 mm, rock wool (Run No. 552), carbon black (Run No. 553), hollow microspheres (Run No. 554), wood flour (Run No. 555), kraft pulp (Run No. 556) and 6-nylon staples (Run No. 557) cut to a size of 3 mm. A predetermined amount of the mixture was put in a mold heated to a temperature of 120° C. using a press and treated under a pressure of 300 kg/cm° for 30 minutes to give ten molded test pieces having a width of 12 mm, a length of 100 mm and a thickness of 4.8 to 5.1 mm in each Run. Similarly, ten molded test pieces were prepared under the same conditions as above using 60 parts by weight of the product of Run No. 47 (as a matrix) and 47 parts by weight of the glass staples (Run No. 558) and wood flour (Run No. 559). For comparison, 60 parts by weight, as solids, of the uncured resol resin used in Run No. 21 (as a matrix) as a solution was mixed with 40 parts by weight of each of glass staples (Run No. 560) cut to 3 mm, rock wool (Run No. 561), carbon black (Run No. 562), hollow microspheres (Run No. 563), wood flour (Run No. 564), kraft pulp (Run No. 565) and 6-nylon staples cut to 3 mm (Run No. 566). The mixture was dried in the air at room temperature for 24 hours, and then dried at 80° C. for 30 minutes to remove the solvent. A predetermined amount of the resulting mixture was treated under a pressure of 300 kg/cm² for 30 minutes in a mold heated in advance to 150° C. using a press to give ten molded test samples each having a width of 12 mm, a length of 100 mm and a thickness of 3.0 to 3.2 mm in each run.

Table 26 shows the types of the matrices and fillers used, the average flexural strength of five molded samples, and the heat-resistant temperatures of the molded samples.

TABLE 26

| Run No. | Type of the matrix | Type of the filler | Flexural strength (kg/cm²) | Heat-resistant temperature (°C.) |
|---|---|---|---|---|
| 551 | Product of Run No. 43 | Glass staples | 880 | 210 |
| 552 | Product of Run No. 43 | Asbestos | 670 | 190 |
| 553 | Product of Run No. 43 | Carbon black | 520 | 220 |
| 554 | Product of Run No. 43 | Hollow microspheres | 510 | 210 |
| 555 | Product of Run No. 43 | Wood flour | 460 | 170 |
| 556 | Product of Run No. 43 | Kraft pulp | 650 | 170 |
| 557 | Product of Run No. 43 | 6-Nylon staples | 770 | 150 |
| 558 | Product of Run No. 47 | Glass staples | 830 | 210 |
| 559 | Product of Run No. 47 | Wood flour | 470 | 170 |
| 560 | Resol resin of Run No. 21 | Glass staples | 650 | 180 |
| 561 | Resol resin of Run No. 21 | Asbestos | 460 | 160 |
| 562 | Resol resin of Run No. 21 | Carbon black | 440 | 180 |
| 563 | Resol resin of Run No. 21 | Hollow microspheres | 290 | 190 |
| 564 | Resol resin of Run No. 21 | Wood flour | 320 | 150 |
| 565 | Resol resin of Run No. 21 | Kraft pulp | 470 | 140 |
| 566 | Resol resin of Run No. 21 | 6-Nylon staples | 570 | 120 |

In Runs Nos. 551 to 559, molding could be performed without any trouble, but in Runs Nos. 560 to 566, the flow of the resin was poor and much gases were generated, thus showing poor moldability.

EXAMPLE 16

In accordance with the method of Example 15, 30 parts by weight of the product of Run No. 12 (as a filler), 25 parts by weight of glass staples cut to a size of 2 mm (as a filler) and 45 parts by weight of each of the uncured resol resin used in Run No. 21, the novolak resin used in Run No. 22 (containing 15 parts by weight of hexamine), a furan resin (Hitafuran 303, a tradename for a product of Hitachi Chemical, Limited), an epoxy resin (Epikote 815, a tradename for a product of Shell Chemical Co.) and a melamine resin (MERUMAITE, a tradename for a product of Toyo Koatsu Co., Ltd.) as a matrix (Runs Nos. 571 to 575 in this order of matrices) were mixed in the form of a powder or solution. A predetermined amount of each of the resulting mixtures was molded at a temperature of 150° to 170° C. under a pressure of 200 to 400 kg/cm² for 30 minutes using a hot press and a mold in accordance with Example 1 to give five test samples for measurement of compression strength each having a width of 10 mm, a length of 10 mm and a thickness of 3.5 to 3.6 mm and five test samples for measurement of heat conductivity each having a width of 100 mm, a length of 100 mm and a thickness of 4.9 to 5.1 mm.

As controls, test samples were prepared in the same way as above using 55 parts by weight of glass fibers cut to a length of 2 mm, and 45 parts by weight of each of the uncured resol resin used in Run No. 21, the novolak resin used in Run No. 22 (containing 15 parts by weight of hexamethylenetetramine), the furan resin, the epoxy resin and the melamine resin (Run Nos. 576 to 580).

Table 27 summarizes the types and amounts of the fillers used, the types of the matrices (45 parts by weight), and the average compression strength and heat conductivity values of the molded articles.

Each of the mixtures was molded at a temperature of 150° to 180° C. under a pressure of 200 kg/cm$^2$ to prepare 15 test samples having a width of 12 mm, a length of 100 mm and a thickness of 3.0 to 3.5 mm in each run.

Table 28 summarizes the amounts of the resol resin (solids), the product of Run No. 35 and the powders of Runs Nos. 21 and 22, the moldability of each of the mixtures, and the heat resistant temperature and volume resistivities of the molded articles.

TABLE 28

| Run No. | Resol resin (parts by weight) | Filler Type | Filler Amount (parts by weight) | Moldability | Molded article Heat resistant temperature (° C.) | Molded article Volume resistivity (ohm-cm) |
|---|---|---|---|---|---|---|
| 581 | 100 | Product of Run No. 35 | 0 | Very difficult | 150 | $10^{13}$ |
| 582 | 85 | Product of Run No. 35 | 15 | Good | 180 | $10^{14}$ |
| 583 | 75 | Product of Run No. 35 | 25 | Very good | 210 | $10^{14}$ |
| 584 | 65 | Product of Run No. 35 | 35 | Very good | 230 | $10^{14}$ |
| 585 | 50 | Product of Run No. 35 | 50 | Very good | 240 | $10^{14}$ |
| 586 | 50 | Powder of Run No. 21 | 50 | Difficult | 160 | $10^{11}$ |
| 587 | 50 | Powder of Run No. 22 | 50 | Good | 140 | $10^{12}$ |

TABLE 27

| Run No. | Filler (parts by weight) Product of Run No. 12 | Filler (parts by weight) Glass fibers | Matrix resin (45 parts by weight) | Compression strength (kg/cm$^2$) | Heat conductivity (cal/cm · sec · ° C.) |
|---|---|---|---|---|---|
| 571 | 30 | 26 | Resol resin | 2,430 | $5.7 \times 10^{-4}$ |
| 572 | 30 | 25 | Novolak resin | 2,040 | $6.2 \times 10^{-4}$ |
| 573 | 30 | 25 | Furan resin | 1,720 | $6.8 \times 10^{-4}$ |
| 574 | 30 | 25 | Epoxy resin | 1,530 | $6.5 \times 10^{-4}$ |
| 575 | 30 | 252 | Melamine resin | 1,460 | $9.1 \times 10^{-4}$ |
| 576 | Not used | 55 | Resol resin | 1,780 | $10.4 \times 10^{-4}$ |
| 577 | Not used | 55 | Novolak resin | 1,270 | $10.8 \times 10^{-4}$ |
| 578 | Not used | 55 | Furan resin | 1,040 | $10.9 \times 10^{-4}$ |
| 579 | Not used | 55 | Epoxy resin | 1,150 | $11.1 \times 10^{-4}$ |
| 580 | Not used | 55 | Melamine resin | 940 | $14.6 \times 10^{-4}$ |

As in Runs Nos. 576 to 580, an attempt was made to obtain a molded article by using 25 parts by weight of glass fibers and 75 parts by weight of each of the matrix resins without the product of Run No. 12. But the moldability was poor and molded articles of satisfactory quality could not be obtained.

EXAMPLE 17

The uncured resol resin solution used in Run No. 21 was mixed with the product of Run No. 35 as a filler in various proportions. The mixtures were each dried in the air at room temperature for 48 hours, and further treated at 70° C. for 60 minutes. A molding mixture was prepared in the same way as above from the aforesaid resol resin solution and each of the powders obtained in Runs Nos. 21 and 22.

EXAMPLE 18

Sixty parts by weight of the product of Run No. 135 (as a matrix) was mixed with 40 parts by weight of each of glass staples (Run No. 671) cut to a size of 3 mm, rock wool (Run No. 672), carbon black (Run No. 673), hollow microspheres (Run No. 674), wood flour (Run No. 675), kraft pulp (Run No. 676), 6-nylon staples (Run No. 677) cut to a size of 3 mm, and Kevlar staples (Run No. 678) cut to a size of 3 mm. A predetermined amount of the mixture was put in a mold hated to a temperature of 120° C. using a press and treated under a pressure of 250 to 350 kg/cm$^2$ for 30 minutes to give ten molded test pieces having a width of 12 mm, a length of 100 mm and a thickness of 3.5 to 3.8 mm in each run. Similarly, ten molded test samples were prepared under the same conditions as above from each of mixtures prepared from 60 parts by weight of the product of Run No. 163 (as a matrix) and 40 parts by weight of the glass staples (Run No. 679), the wood flour (Run No. 680) and the 6-nylon staples (Run No. 681), respectively, and mixtures prepared from 60 parts by weight of the product of Run No. 167 (as a matrix) and 40 parts by weight of the glass staples (Run No. 682), the wood flour (Run No. 683) and the 6-nylon staples (Run No. 684), respectively.

For comparison, 60 parts by weight of the uncured resol resin (as a matrix) used in Run No. 21 as a solution was mixed with 40 parts by weight of each of glass staples (Run No. 685) cut to a size of 3 mm, rock wool (Run No. 686), carbon black (Run No. 687), hollow microspheres (Run No. 688), wood flour (Run No. 689), kraft pulp (Run No. 690), 6-nylon staples (Run No. 691) cut to a size of 3 mm and Kevlar staples (Run No. 692) cut to a size of 3 mm. The mixture was dried in the air at room temperature for 24 hours, and then dried at 80° C. for 30 minutes to remove the solvent. A predetermined amount of the resulting mixture was treated under a pressure of 250 to 350 kg/cm² for 30 minutes in a mold heated in advance to 150° C. using a press to give ten molded test samples each having a width of 12 mm, a length of 100 mm and a thickness of 3.0 to 3.2 mm in each run.

Table 29 shows the types of the matrices and fillers used, the average flexural strength of five molded samples, and the heat-resistant temperatures of the five molded samples.

TABLE 29

| Run No. | Type of the matrix | Type of the filler | Flexural strength (kg/cm²) | Heat-resistant temperature (°C.) |
|---|---|---|---|---|
| 671 | Product of Run No. 135 | Glass staples | 1.030 | 220 |
| 672 | Product of Run No. 135 | Rock wool | 780 | 190 |
| 673 | Product of Run No. 135 | Carbon black | 640 | 230 |
| 674 | Product of Run No. 135 | Hollow microspheres | 600 | 220 |
| 675 | Product of Run No. 135 | Wood flour | 510 | 170 |
| 676 | Product of Run No. 135 | Kraft pulp | 690 | 180 |
| 677 | Product of Run No. 135 | 6-Nylon staples | 870 | 170 |
| 678 | Product of Run No. 135 | Glass staples | 1.210 | 200 |
| 679 | Product of Run No. 163 | Kelvar fibers | 1.140 | 230 |
| 680 | Product of Run No. 163 | Wood flour | 630 | 170 |
| 681 | Product of Run No. 163 | 6-Nylon staples | 770 | 180 |
| 682 | Product of Run No. 167 | Glass staples | 1.090 | 220 |
| 683 | Product of Run No. 167 | Wood flour | 540 | 180 |
| 684 | Product of Run No. 167 | 6-Nylon staples | 810 | 160 |
| 685 | Resol resin of Run No. 21 | Glass staples | 650 | 180 |
| 686 | Resol resin of Run No. 21 | Rock wool | 460 | 160 |
| 687 | Resol resin of Run No. 21 | Carbon black | 440 | 180 |
| 688 | Resol resin of Run No. 21 | Hollow microspheres | 290 | 190 |
| 689 | Resol resin of Run No. 21 | Wood flour | 320 | 150 |
| 690 | Resol resin of Run No. 21 | Kraft pulp | 470 | 140 |
| 691 | Resol resin of Run No. 21 | 6-Nylon staples | 570 | 120 |
| 692 | Resol resin of Run No. 21 | Kelvar fibers | 780 | 120 |

In Runs Nos. 671 to 684, molding could be performed easily without any trouble. But in Runs Nos. 685 to 692, the flow of the resin composition was poor, or the resol resin melted away from the mold. Furthermore, much gases were generated to degrade moldability.

EXAMPLE 19

In accordance with the method of Example 18, 30 parts by weight of the product of Run No. 140 (as a filler), 25 parts by weight of glass staples cut to a size of 2 mm (as a filler) and 45 parts by weight of each of the uncured resol resin used in Run No. 21, the novolak resin used in Run No. 22 (containing 15 parts by weight of hexamine), a furan resin (Hitafuran 303, a tradename of Hitachi Chemical, Limited), an epoxy resin (Epikote 815, a tradename for a product of Shell Chemical Co.) and a melamine resin (MERVMAITE, a tradename for a product of Toyo Koatsu Co., Ltd.) as a matrix (Runs Nos. 693 to 697 in this order of matrices) were mixed in the form of a powder or solution. A predetermined amount of each of the resulting mixtures was molded at a temperature of 150° to 170° C. under a pressure of 200 to 400 kg/cm² for 30 minutes using a hot press and a mold in accordance with Example 18 to give five test samples for measurement of compression strength each having a width of 10 mm, a length of 10 mm and a thickness of 3.3 to 3.7 mm and five test samples for measurement of heat conductivity each having a width of 100 mm, a length of 100 mm and a thickness of 4.7 to 5.1 mm. Similarly, test samples were prepared as above using the product of Run No. 147 (as a filler) and the product of Run No. 150 (as a filler) (Runs Nos. 698 to 707).

As controls, test samples were prepared in the same way as above using 55 parts by weight of glass fibers cut to a length of 2 mm, and 45 parts by weight of each of the uncured resol resin used in Run No. 21, the novolak resin used in Run No. 22 (containing 15 parts by weight of hexamethylenetetramine), the furan resin, the epoxy resin and the melamine resin (Runs Nos. 708 to 712).

Table 30 summarizes the types and amounts of the fillers used, the types of the matrices (45 parts by weight), and the average compression strength and heat conductivity values of the molded articles.

TABLE 30

| | Filler (parts by weight) | | | | |
|---|---|---|---|---|---|
| Run No. | Type of the filler (30 parts by weight) | Glass fibers | Type of the matrix (45 parts by weight) | Compression strength (kg/cm²) | Heat conductivity (cal/cm. sec. °C.) |
| 693 | Product of Run No. 140 | 25 | Resol resin | 2.640 | $6.1 \times 10^{-4}$ |
| 694 | Product of Run No. 140 | 25 | Novolak resin | 2.050 | $6.9 \times 10^{-4}$ |
| 695 | Product of Run No. 140 | 25 | Furan resin | 1.920 | $7.6 \times 10^{-4}$ |
| 696 | Product of Run No. 140 | 25 | Epoxy resin | 1.680 | $7.2 \times 10^{-4}$ |
| 697 | Product of Run No. 140 | 25 | Melamine resin | 1.590 | $10.3 \times 10^{-4}$ |
| 698 | Product of Run No. 147 | 25 | Resol resin | 2.210 | $7.4 \times 10^{-4}$ |
| 699 | Product of Run No. 147 | 25 | Novolak resin | 1.870 | $6.9 \times 10^{-4}$ |
| 700 | Product of Run No. 147 | 25 | Furan resin | 1.550 | $8.6 \times 10^{-4}$ |
| 701 | Product of Run No. 147 | 25 | Epoxy resin | 1.440 | $8.5 \times 10^{-4}$ |
| 702 | Product of Run No. 147 | 25 | Melamine resin | 1.230 | $11.3 \times 10^{-4}$ |
| 703 | Product of Run No. 150 | 25 | Resol resin | 2.390 | $5.4 \times 10^{-4}$ |
| 704 | Product of Run No. 150 | 25 | Novolak resin | 2.110 | $6.7 \times 10^{-4}$ |

TABLE 30-continued

| Run No. | Filler (parts by weight) Type of the filler (30 parts by weight) | Glass fibers | Type of the matrix (45 parts by weight) | Compression strength (kg/cm$^2$) | Heat conductivity (cal/cm. sec. °C.) |
|---|---|---|---|---|---|
| 705 | Product of Run No. 150 | 25 | Furan resin | 1.860 | 7.4 × 10$^{-4}$ |
| 706 | Product of Run No. 150 | 25 | Epoxy resin | 1.540 | 6.8 × 10$^{-4}$ |
| 707 | Product of Run No. 150 | 25 | Melamine resin | 1.470 | 9.7 × 10$^{-4}$ |
| 708 | Not used | 55 | Resol resin | 1.780 | 10.4 × 10$^{-4}$ |
| 709 | Not used | 55 | Novolak resin | 1.270 | 10.8 × 10$^{-4}$ |
| 710 | Not used | 55 | Furan resin | 1.040 | 10.9 × 10$^{-4}$ |
| 711 | Not used | 55 | Epoxy resin | 1.150 | 11.1 × 10$^{-4}$ |
| 712 | Not used | 55 | Melamine resin | 940 | 14.6 × 10$^{-4}$ |

As in Runs Nos. 708 to 712, an attempt was made to obtain molded articles by using 25 parts by weight of glass staples and 75 parts by weight of each of the matrix resins without the product of Run No. 140, or the product of Run No. 147 or the product of Run No. 150. But the matrix resin flowed out from the mold or foamed, so that molded articles of satisfactory quality could not be obtained.

EXAMPLE 20

The uncured resol resin solution used in Run No. 21 was mixed with the product of Run No. 112 as a filler in various proportions. Each of the mixtures was dried in the air at room temperature for 48 hours, and further treated at 70° C. for 60 minutes. Molding mixtures were prepared in the same way as above from the aforesaid resol resin solution and the powders of Runs Nos. 21 and 22 as fillers.

Each of the molding mixtures obtained was molded at 150° to 180° C. and 200 kg/cm$^2$ using a press and a mold to give 15 test samples each having a width of 12 mm, a length of 100 mm and a thickness of 3.0 to 3.5 mm in each run.

Table 31 summarizes the amounts of the resol resin (solids), the product of Run No. 112, the powder of Run No. 21 and the powder of Run No. 22, the moldability of each of the molding mixtures, and the heat resistant temperatures and volume resistivities before or after boiling of the resulting molded products.

TABLE 31

| Run No. | Resol resin (parts by weight) | Filler Type | Amount (parts by weight) | Moldability | Molded article Heat resistant temperature (°C.) | Volume resistivity (ohm-cm) Before boiling | After boiling |
|---|---|---|---|---|---|---|---|
| 713 | 100 | Product of resin No. 112 | 0 | Very difficult | 150 | 10$^{14}$ | 10$^5$ |
| 714 | 85 | Product of resin No. 112 | 15 | Good | 180 | 10$^{14}$ | 10$^{12}$ |
| 715 | 75 | Product of resin No. 112 | 25 | Very good | 220 | 10$^{14}$ | 10$^{13}$ |
| 716 | 65 | Product of resin No. 112 | 35 | " | 240 | 10$^{14}$ | 10$^{14}$ |
| 717 | 50 | Product of resin No. 112 | 50 | " | 250 | 10$^{13}$ | 10$^{13}$ |
| 718 | 40 | Product of resin No. 112 | 60 | " | 250 | 10$^{13}$ | 10$^{13}$ |
| 719 | 50 | Powder of Run No. 21 | 50 | Difficult | 160 | 10$^{14}$ | 10$^8$ |
| 720 | 50 | Powder of Run No. 22 | 50 | Good | 140 | 10$^{13}$ | 10$^9$ |

The test samples obtained in Runs Nos. 713, 719 and 720 showed traces of foaming and surface roughness.

EXAMPLE 21

Forty parts by weight of the uncured novolak resin used in Run No. 22 (as a filler) was mixed in powder form with 60 parts by weight of each of the product of Run No. 113, the product of Run No. 167, the product of Run No. 21, the powder of Run No. 22 and the powder of Run No. 23. Each of the mixtures was put in methanol heated in advance to 160° C., extruded from a nozzle having a diameter of 1 mm under a pressure of 5 kg/cm$^2$ and received in a square mold each side measuring 50 mm and having a depth of 25 mm. The resulting plate-like article was cooled to room temperature and then withdrawn from the mold.

Table 32 summarizes the extrusion moldability of each of the mixtures, the apparent thickness and bulk density of each of the plate-like articles extruded from the nozzle, and the shape of each plate-like article when it was heated to a temperature of 200° C. at a rate of 25° C./hour in a desiccator.

TABLE 32

| Run No. | Type of the filler | Extrusion moldability | Plate-like article Apparent thickness (mm) | Bulk density (g/cc) | Shape upon heat-treatment at 200° C. |
|---|---|---|---|---|---|
| 721 | Product of Run No. 113 | Very good | 24–25 | 0.3–0.4 | Partly melted; shape retained. |
| 722 | Product of Run No. 167 | Very good | 24–25 | 0.4–0.5 | Infusible; shape retained. |
| 723 | Powder of Run No. 21 | The nozzle was | 12–13 | 0.7–0.8 | Melted |

TABLE 32-continued

| Run No. | Type of the filler | Extrusion moldability | Plate-like article Apparent thickness (mm) | Bulk density (g/cc) | Shape upon heat-treatment at 200° C. |
|---|---|---|---|---|---|
| 724 | Powder of Run No. 22 | blocked up gradually. The nozzle was blocked up gradually. | 19–20 | 0.6–0.7 | Melted |
| 725 | Powder of Run No. 23 | The nozzle was blocked up within a short period of time. | 2–3 | 0.9–1.0 | Melted |

In the plate-like articles obtained in Runs Nos. 721 and 722, the filler and the matrix were present in the uniformly mixed state. On the other hand, in Runs Nos. 723 to 725, the proportion of the matrix increased as the time passed after the extrusion of the articles from the nozzle.

What is claimed is:

1. A resin composition comprising
(I) a granular or powdery resin which is a condensation product of a phenol, an aldehyde and optionally a nitrogen-containing compound having at least two active hydrogens and is characterized (A) in that at least 30% of the granular or powdery resin consists of spherical primary particles and their secondary agglomerated particles each having a particle diameter of 0.1 to 150 microns, (B) by having such a size that at least 50% by weight thereof can pass through a 100 Tyler mesh sieve, (C) by having a free phenol content, determined by liquid chromatography, of not more than 500 ppm, and (D) in that the granular or powdery resin which is a condensation product of a phenol and an aldehyde has a $D_{990\text{-}1015}/D_{1600}$ ratio of from 0.2 to 9.0 and $D_{890}/D_{1600}$ ratio of from 0.09 to 1.0 in its infrared absorption spectrum measured by a KBr tablet method, in which $D_{1600}$ represents the absorption intensity of an absorption peak at 1600 cm$^{-1}$, $D_{990\text{-}1015}$ represents the highest absorption intensity of absorption peaks in the range of 990 to 1015 cm$^{-1}$, and $D_{890}$ represents the absorption intensity of an absorption peak at 890 cm$^{-1}$, and the granular or powdery resin which is a nitrogen-containing condensation product of a phenol, an aldehyde and a nitrogen-containing compound having at least two active hydrogens has a $D_{960\text{-}1020}/D_{1450\text{-}1500}$ ratio of from 0.1 to 2.0 in its infrared absorption spectrum measured by a KBr tablet method in which $D_{1450\text{-}1500}$ represents the highest absorption intensity of absorption peaks in the range of 1450 to 1500 cm$^{-1}$, and $D_{960\text{-}1020}$ represents the highest absorption intensity of absorption peaks in the range of 960 to 1020 cm$^{-1}$; and
(II) at least one thermoplastic resin and, optionally, a filler material other than said granular or powdery resin (I).

2. The composition of claim 1 wherein at least 50% of the granular or powdery resin consists of spherical primary particles and their secondary agglomerated particles each having a particle diameter of 0.1 to 100 microns.

3. The composition of claim 1 wherein at least 70% by weight of the granular or powdery resin has a size that can pass through a 100 Tyler mesh sieve.

4. The composition of claim 1 wherein at least 30% of the granular or powdery resin consists of spherical primary particles and their secondary agglomerated particles each having a particle diameter of 0.1 to 100 microns.

5. The composition of claim 1 or 4 wherein at least 70% by weight of the granular or powdery resin has a size that can pass through a 150 Tyler mesh sieve.

6. The composition of claim 1 wherein the granular or powdery resin is the condensation product of the phenol, aldehyde and nitrogen-containing compound and has a $D_{1280\text{-}1360}/D_{1450\text{-}1500}$ ratio of from 0.15 to 3.0 in its infrared absorption spectrum measured by a KBr tablet method in which $D_{1280\text{-}1360}$ represents the highest absorption intensity of absorption peaks in the range of 1280 to 1360 cm$^{-1}$, and $D_{1450\text{-}1500}$ represents the highest absorption intensity of absorption peaks in the range of 1450 to 1500 cm$^{-1}$.

7. The composition of claim 1 wherein the granular or powdery resin is at least partly fused when maintained at 100° C. for 5 minutes in accordance with the heat fusibility test described in the specification.

8. The composition of claim 1 wherein the granular or powdery resin has a methanol solubility, S defined by the following equation, of at least 20% by weight $$S = [(W_o - W_1)/W_o] \times 100(\%)$$

wherein $W_o$ is the weight in grams of the resin, and $W_1$ is the weight in grams of the resin left after heating under reflux, when about 10 g of the resin is heated under reflux in 500 ml of substantially anhydrous material.

9. The composition of claim 1 wherein the granular or powdery resin (I) does not substantially melt or melt-adhere when maintained at 100° C. for 5 minutes in accordance with the heat fusibility test described in the specification.

10. The composition of claim 1 wherein the thermoplastic resin is a polyethylene resin, a polypropylene resin, a polystyrene resin, an acrylic resin, a vinyl resin, a fluorine-containing resin, a polyacetal resin, a polyamide resin, a polyester resin, a polycarbonate resin or a polyurethan resin.

11. The composition of claim 1 wherein the proportion of the granular or powdery resin (I) is 0.01 to 20 parts by weight per part by weight of the thermoplastic resin.

12. The composition of claim 1 which includes the filler material and wherein the filler material is an inorganic substance.

13. The composition of claim 12 wherein the filler material is glass fibers, carbon fibers or rock wool.

14. The composition of claim 12 wherein the filler material is carbon, silica, alumina, silica-alumina, diatomaceous earth, calcium carbonate, calcium silicate, magnesium oxide, clay, antimony oxide or hollow microspheres.

15. The composition of claim 1 which includes the filler material and wherein the filler material is an organic material.

16. The composition of claim 15 wherein the organic filler material is wood flour, linter, pulp or polyamide fibers.

17. The composition of any one of claims 1, 12, 13, 14, 15 or 16 wherein the proportion of the filler material is not more than 30% by weight based on the total weight of the resin composition.

18. The composition of claim 1 wherein the granular or powdery resin (I) is the condensation product of the phenol and aldehyde.

19. The composition of claim 1 wherein the granular or powdery resin (I) is the condensation product of the phenol, aldehyde and the nitrogen-containing compound having at least two active hydrogens.

* * * * *